(12) United States Patent
Minamimoto et al.

(10) Patent No.: US 6,317,843 B1
(45) Date of Patent: Nov. 13, 2001

(54) ERRONEOUS PACKAGE MOUNTING DETERMINATION METHOD FOR A TRANSMISSION DEVICE, AND A TRANSMISSION DEVICE USING THE SAME

(75) Inventors: Kazuhiro Minamimoto; Jun-ichi Shimada, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/165,755

(22) Filed: Oct. 2, 1998

(30) Foreign Application Priority Data

Oct. 3, 1997 (JP) .................................................. 9-271646

(51) Int. Cl.[7] .................................................. G06F 11/00
(52) U.S. Cl. .................. 714/4; 714/48; 710/102; 370/912
(58) Field of Search .................. 714/4, 708, 799, 714/48; 370/912, 252, 235, 431, 302, 464; 710/60, 127, 102, 103; 455/103

(56) References Cited

U.S. PATENT DOCUMENTS 5,227,876 * 7/1993 Cucchi et al. .
5,442,637 * 8/1995 Nguyen .
5,594,490 * 1/1997 Dawson et al. .
5,602,831 * 2/1997 Gaskill .

* cited by examiner

Primary Examiner—Gopal C. Ray
(74) Attorney, Agent, or Firm—Rosenman & Colin, LLP

(57) ABSTRACT

A method for detecting an erroneous IF board mounting in a transmission device which can be employed even when one-to-one correspondence is not established for slots on a transmission device and normally mounted IF boards determines when the transmission device is activated, for each of transmission channel interfaces, whether or not a plurality of types of packages having different transmission speeds are mounted. When a plurality of types of packages having different transmission speeds coexist at one of the transmission channel interfaces, it is concluded that all the packages in the transmission channel interface are erroneously mounted.

26 Claims, 34 Drawing Sheets

FIG. 16C    FIG. 16B    FIG. 16A

Slot address

| 1 | Erroeneously mounted |
| 2 | — |
| 3 | Normally mounted |
| 4 | Normally mounted |
| 5 | Normally mounted |
| 6 | Erroeneously mounted |

Slot address | | System ID
--- | --- | ---
1 | B | ⎫
2 | Unmounted | ⎬ 1
3 | A | ⎭
4 | A | ⎫
5 | A | ⎬ 2
6 | B | ⎭

Priority order

| 1 | A |
| 2 | B |
| 3 | Stopper |

Search order ↓

A: IF board ID of IF board A
B: IF board ID of IF board B

ERRONEOUS PACKAGE MOUNTING DETERMINATION METHOD FOR A TRANSMISSION DEVICE, AND A TRANSMISSION DEVICE USING THE SAME

BACKGROUND OF THE INVENTION

1. Field of the Invention

The present invention relates to an erroneous package mounting determination method for a transmission device, and a transmission device employing this method. In particular, the present invention pertains to a method whereby erroneous package mounting is determined for a transmission device which can mount packages, each of which has transmission circuits corresponding to a plurality of transmission speeds.

2. Related Arts

Recently, as one consequence of the development of the information society, the societal importance of networks, as well as the scale of networks, constructed using transmission devices has increased, and there has been a corresponding increase in the quantity of information handled. As a result, an improvement in the reliability and the safety provided by networks is urgently desired.

In this situation, transmission devices having multiple packages mounted in a device frame have come to be employed. And for this reason, the employment of a faulty package mounting operation, i.e., the erroneous mounting of packages, will result in the cutoff of an operation line, or the like, and in the occurrence of a critical obstacle to the effective use of an application by clients.

Therefore, a transmission device is desired which is designed while taking into account a fail-safe process permitting the mounting of packages with minimal, or no, damage being incurred by erroneous package mounting.

In accordance with this desire, a conventional method for attaching a label to a package (hereinafter referred to as an IF board) to prevent erroneous mounting is provided as a first technique whereby the erroneous mounting of an IF board can either be prevented or visually discerned.

According to this method, labels describing the name of an IF board, a diagram number, and the name of a mounting device are attached to an IF board, so that a worker can ascertain visually whether an IF board should be mounted on a specific device. With this method, whether or not an erroneous mounting incident occurs depends on how attentive to detail a worker is.

A second technique is a method by which whether an erroneous mounting has occurred can be determined using an IF board ID. FIG. 34 is a diagram for explaining the arrangement of a transmission device which employs this method. A transmission device 1 includes a processor 2, a plurality of IF boards 5, a comparator 11, a memory 10, and a display unit 12. The IF boards 5 each carry IF board type identification information inherent to individual IF board types (hereinafter referred to an IF board ID).

This information is stored in an IF board ID storage unit 51 mounted on each of the IF boards 5. In the memory 10 are stored data concerning mounting slots in the device, and a pair of IF board IDs for IF boards to be mounted in the slots.

With this arrangement, the determination of whether a board has been erroneously mounted is performed as follows. When an IF board 5 is mounted in a specific slot, the processor 2 acquires the IF board ID from the IF board ID storage unit 51 on the mounted IF board 5, and the processor 2 acquires from the memory 10 the IF board ID for an IF board which should be mounted in the slot.

Then, the IF board ID acquired from the mounted IF board 5 and the IF board ID for the IF board which should be mounted, acquired from the memory 10, are input to the comparator 11. When as a result of the comparison by the comparator 11 it is found that the two IF board IDs match, it is ascertained that the IF board 5 is correctly mounted. Whereas, if the two IF board IDs do not match, it is ascertained that the IF board 5 is erroneously mounted.

A third technique is a method whereby an erroneous mounting is determined by using a difference between the terminal positions of an IF board. FIG. 35 is a diagram for explaining this method. A transmission device 1 includes IF boards 5, slots 13 and a processor 2. Each IF board 5 includes an identification terminal 52 and an IF board internal loop 54. Each slot 13 includes identification terminals 131 and a common terminal 132.

The common terminal 53 and the identification terminal 52 on the IF board 5 are connected to form a loop, with the position of the identification terminal 52, which is one end of the loop, differing with the IF board type. The common terminal 132 is used in common by all the slots 13, and is connected to the processor 2. For the individual slots 13, only the identification terminals 131 corresponding to the IF board types which are normally to be mounted are connected in parallel to the processor 2.

In the arrangement shown in FIG. 35, the process for determining an erroneous mounting is performed as follows. First, the processor 2 transmits a common signal 14 to the common terminals 132 of all the slots 13. For the slots 13 in which the IF boards 5 are normally mounted, the common signal 14 passes trough the loops 54 in the IF boards 5 and the identification terminals 52 and returns to the processor 2 (IF boards ① and ② in FIG. 35).

For the slots 13 in which the IF board is erroneously mounted, the IF board 5 and the identification terminals 52 of the slot 13 are rendered nonconductive, and no signal returns to the processor 2 (IF board ③ in FIG. 35).

When the common signal 14 is transmitted in the above described manner, a signal which passes from the identification terminal 52 to the processor 2 is defined as an identification signal 15. Whether or not an IF board is erroneously mounted in a slot can be determined by conducting an examination to detect the presence of such a signal.

A fourth technique is a method whereby erroneous mounting is prevented by employing IF boards having different shapes. According to this method, the shape of a connector on an IF board, or the position of the connector, varies depending on the IF board type, so that an IF board of an incorrect type can not physically be inserted into a slot.

However, the above described conventional erroneous mounting determination methods have the following shortcomings.

Regarding the first conventional technique, it is impossible for errors to be completely prevented when human labor is a factor. The safety required as an operating countermeasure for the erroneous mounting of an IF board can not be ensured. Although the second to the fourth conventional techniques are effective when one-to-one correspondence is established for the slots and normally mounted IF boards, these methods can not be applied when IF boards to be mounted comprise a plurality of types having configurations which correspond to a single slot type.

When the third and the fourth conventional techniques are employed the alteration of hardware is required, and therefore, these techniques are not suitable for saving space of the device and reduction of manufacturing costs.

SUMMARY OF THE INVENTION

To resolve the conventional shortcomings, it is one object of the present invention to provide an erroneous IF board mounting determination method, which can be employed even when a one-to-one correspondence is not established for slots on a transmission device and normally mounted IF boards and when for a single slot there is a plurality of IF board types to be mounted, and to provide a transmission device therefor.

It is another object of the present invention to provide an erroneous IF board mounting determination method whereby protection is afforded which ensures the safety required for its operation as a countermeasure for erroneous IF board mounting, which is an unavoidable problem when a manual IF board mounting process is used, and to provide a transmission device therefor.

It is an additional object of the present invention to provide an erroneous IF board mounting determination method for which software alteration can be employed and for which hardware alteration is not required, and a transmission device therefor.

The other objects of the present invention will become apparent in due course during the explanation of the preferred embodiments given while referring to the accompanying drawings.

To achieve the above objects, according to the basic concept of the present invention, provided is a method for a transmission device, which includes a plurality of transmission channel interfaces on which a plurality of types of packages having different transmission speeds are to be mounted and on each of which only packages having the same transmission speed are permitted to be mounted, the method comprising the steps of:

determining, when the transmission device is activated, for each of the transmission channel interfaces, whether or not a plurality of types of packages having different transmission speeds are mounted; and when a plurality of types of packages having different transmission speeds coexist at one of the transmission channel interfaces, concluding that all the packages in the transmission channel interface are erroneously mounted.

Another method comprises the steps of:

storing, as backup data, types of packages mounted for a transmission device in an operating state;

determining, when the transmission device is next activated, for each of a plurality of transmission channel interfaces, whether or not the plurality of types of packages coexist;

comparing the types of packages with backup data when the plurality of types of packages coexist at the same transmission channel interface; and determining whether packages whose types are matched are normally mounted packages, and whether packages whose types are not matched are erroneously mounted packages.

Furthermore, an additional method comprises the steps of:

defining a priority order for each slot in a plurality of transmission channel interfaces; and determining, when a plurality of types of packages coexist at each of the plurality of transmission channel interfaces, whether a type of package mounted in a slot having a higher priority order is a normally mounted package, and whether a type of package mounted in a slot having a lower priority is an erroneously mounted package.

A further method comprises the steps of:

defining a priority order for a plurality of types of packages having different transmission speeds; and determining, when the plurality of packages coexist at each of a plurality of transmission channel interfaces, whether a type of package mounted in a slot having a higher priority order is a normally mounted package, and whether a type of package mounted in a slot having a lower priority order is an erroneously mounted package.

Still another method comprises the steps of:

determining, when new packages are mounted in a plurality of transmission channel interfaces while a transmission device is in operation and when the new package types differ from package types already mounted in the pertinent transmission channel interfaces, whether the packages already mounted are normally mounted packages and whether new packages are erroneously mounted packages.

A still further method comprises the steps of:

determining, when new packages are mounted in a plurality of transmission channel interfaces while a transmission device is in operation and when the new package types differ from package types already mounted in the pertinent transmission channel interfaces, whether the new packages are normally mounted packages and whether the packages already mounted are erroneously mounted packages.

BRIEF DESCRIPTION OF THE DRAWINGS

FIGS. 16A to 16C are diagrams for explaining the IF board priority table.

DETAILED DESCRIPTION OF THE PREFERRED EMBODIMENTS

Figure 1:
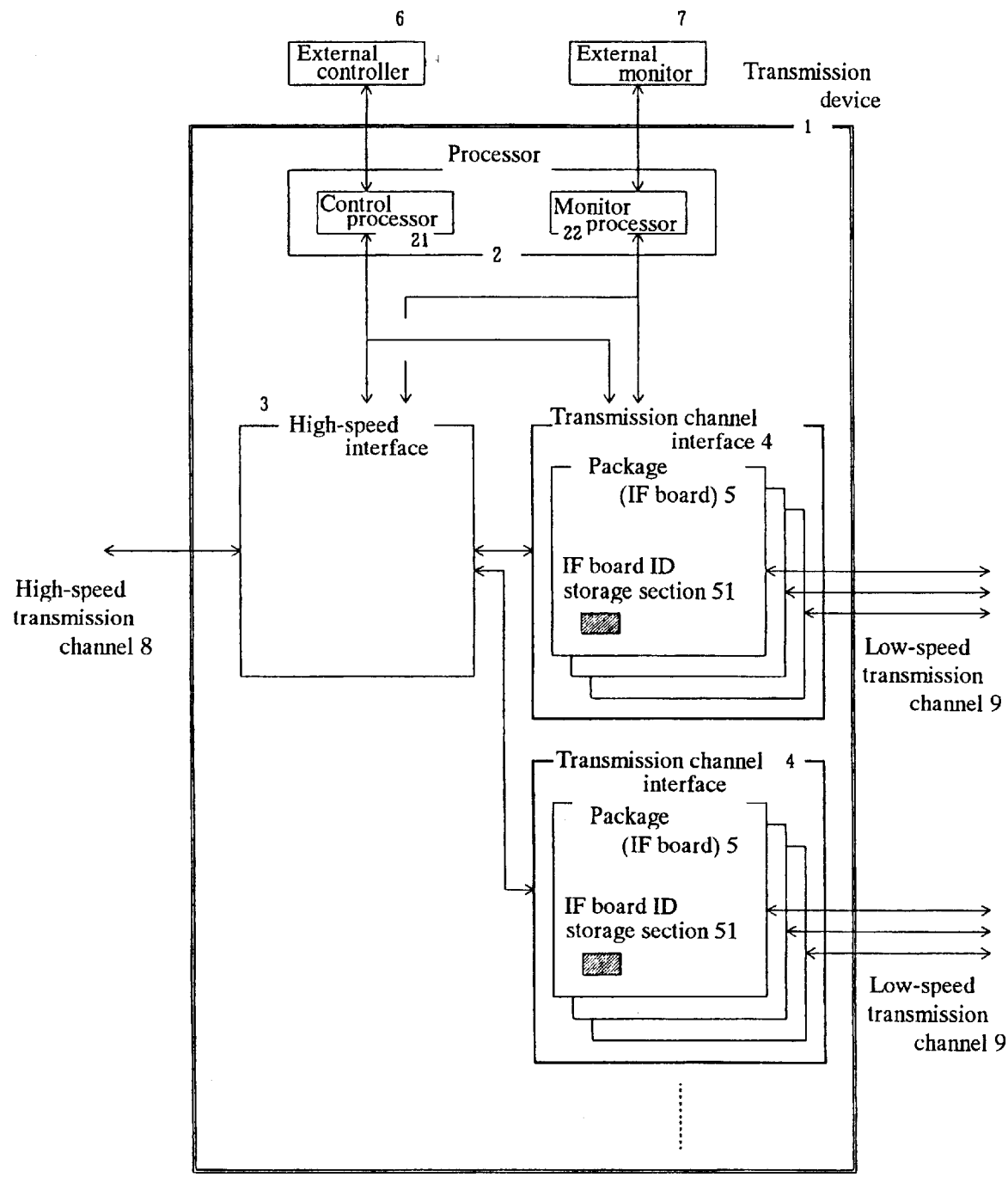
FIG. 1 is a schematic block diagram for explaining the arrangement of a transmission device to which is applied a method according to the present invention for determining the erroneous mounting of IF boards.

The preferred embodiments of the present invention will now be described while referring to the accompanying drawings. The same reference numerals are used throughout to denote corresponding or identical components.

FIG. 1 is a schematic block diagram for explaining the arrangement of a transmission device 1 to which is applied a method according to the present invention for determining the erroneous mounting of IF boards. The transmission device 1 includes a plurality of systems connected to low-speed transmission channels 9. The transmission device 1 is connected to another transmission device via a high-speed transmission channel 8.

Information received across the low-speed transmission channels 9 is multiplexed by system compatible transmission interfaces 4. The multiplexed information is transferred to the transmission channel 8 via a high-speed interface 3. On the other hand, information transmitted across the high-speed transmission channel 8 is received by the high-speed interface 3, and is de-multiplexed by the transmission channel interfaces 4, the resultant information being distributed to the low-speed transmission channels 9.

As is described above, in the transmission device 1, the low-speed transmission channels 9 are retained for each system, each of the low-speed transmission channels 9 being connected to an IF board 5 in the system. Therefore, when a new low-speed transmission channel 9 is to be provided for the transmission device 1, a corresponding IF board must be inserted. At the time an IF board is inserted, an erroneous mounting may occur.

The transmission device 1 includes a processor 2 to which is assigned the responsibility for the execution of software for performing tasks allocated for a control processor 21 and a monitor processor 22. Although these tasks can be performed by hardware components, from the viewpoint of adaptability it is preferable that they be performed by the execution of software.

The control processor 21 controls the entire transmission device 1 based on instructions received from an external controller 6, and notifies the external controller 6 of the processing results. The monitor processor 22 constantly collects the alarm states of the IF boards in the systems 4, which are transmission channel interfaces, and notifies an external monitor 7 of the collection of the alarm information.

A plurality of the IF boards 5 are mounted in the systems 4 to relay or multiplex primary signals to be transmitted by the transmission device 1. Also, upon the receipt of a request from the monitor processor 22, the systems 4 collect information obtained by monitoring the operating states of the IF boards 5, and transmit the information to the monitor processor 22. Furthermore, upon the receipt of an instruction from the control processor 21, the systems 4 control the internal IF boards 5, and notify the control processor 21 of the results.

Each of the IF boards in the systems 4 includes an IF board ID storage section 51 (specifically, it is implemented by using a nonvolatile memory, such as a EEPROM). The IF board ID storage section 51 stores type information (IF board ID) for the IF board 5.

The external monitor 6 issues operating instructions to a transmission device that it controls and receives from the transmission device the results which are obtained. Then, the external controller 6 employs HMI (Human-Machine Interface) means, such as a CRT, to display the received information.

The external monitor 7 receives alarm information from a transmission device that it monitors, and also employs HMI (Human-Machine Interface) means, such as a CRT, to display the alarm information.

Figure 2:
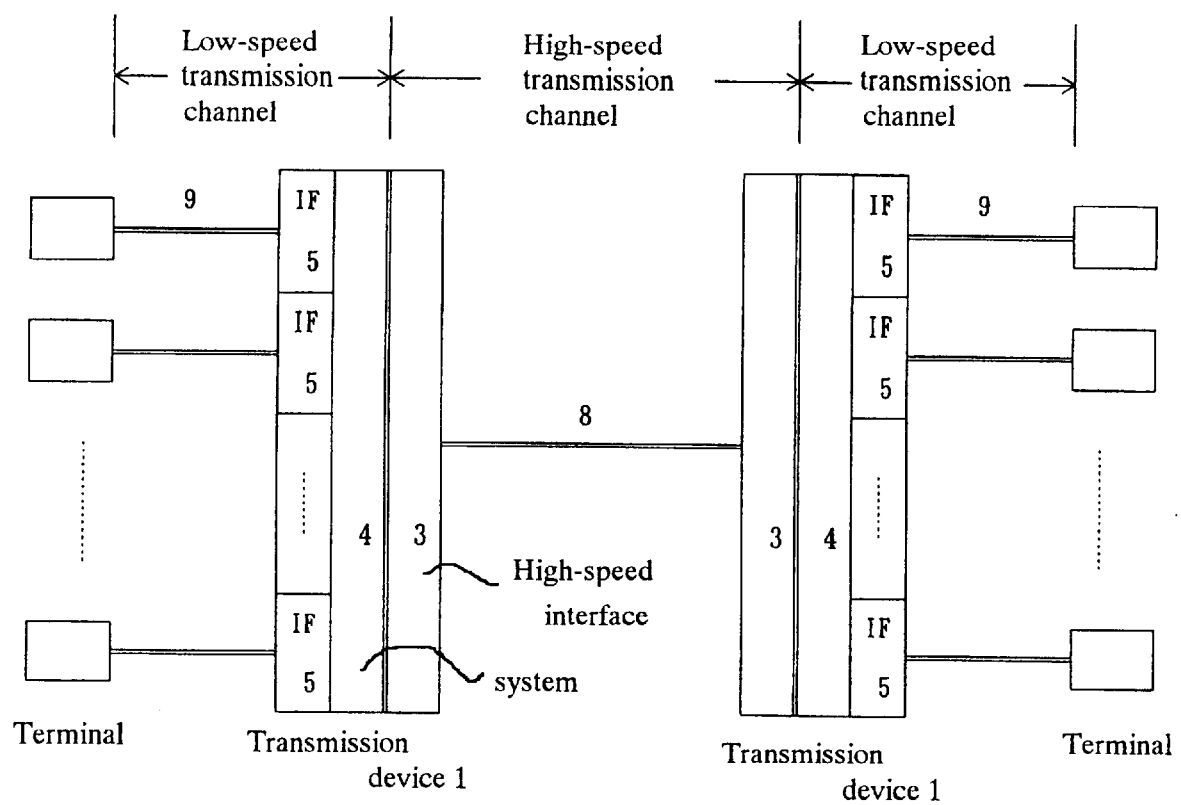
FIG. 2 is a diagram showing an example arrangement of a network wherein the transmission devices according to the present invention are located, and for explaining the positioning of these devices.

FIG. 2 is a diagram showing an example arrangement of a network wherein the transmission devices 1 according to the present invention are located, and for explaining the positioning of these devices. Transmission devices 1, which are each other, are connected together by a high-speed transmission channel 8.

As is shown in FIG. 2, a transmission device 1 includes a high-speed interface 3 and a system (a low-speed interface) 4. The transmission device 1 has a function for multiplexing low-speed transmission channel signals, which are transmitted and received by terminals, into high--speed transmission channel signals, and a function for dividing or de-multiplexing high-speed transmission channel signals, which are transmitted by the transmission devices 1, into low-speed transmission channel signals.

In this case, the transmission speed of the high-speed interface 3 is unique. In the system, there are a plurality of signals having different transmission speeds which are transmitted to, or received from, terminals 6 connected to the low-speed transmission channels 9, and IF boards 5 are mounted in the system to handle individual transmission speeds.

FIG. 3 is a conceptual diagram showing the condition where the IF boards are mounted according to the present invention. An example based on the following assumption is employed for the embodiment of the present invention.

There are two IF boards types, A and B, mounted in the device. The transmission speeds for the IF boards A and B have the relationship (transmission speed for *IF* board *A*):(transmission speed for *IF* board *B*)=1:3.

For example, IF board A=50 M (IF board) and IF board B=150 M (IF board).

In this case, three of the IF boards A can be replaced by one of the IF boards B, and the transmission speeds for three of the IF boards A (for one IF board B) are managed as a single system. An inherent system ID is provided for each system.

Figures 3A, 3B:
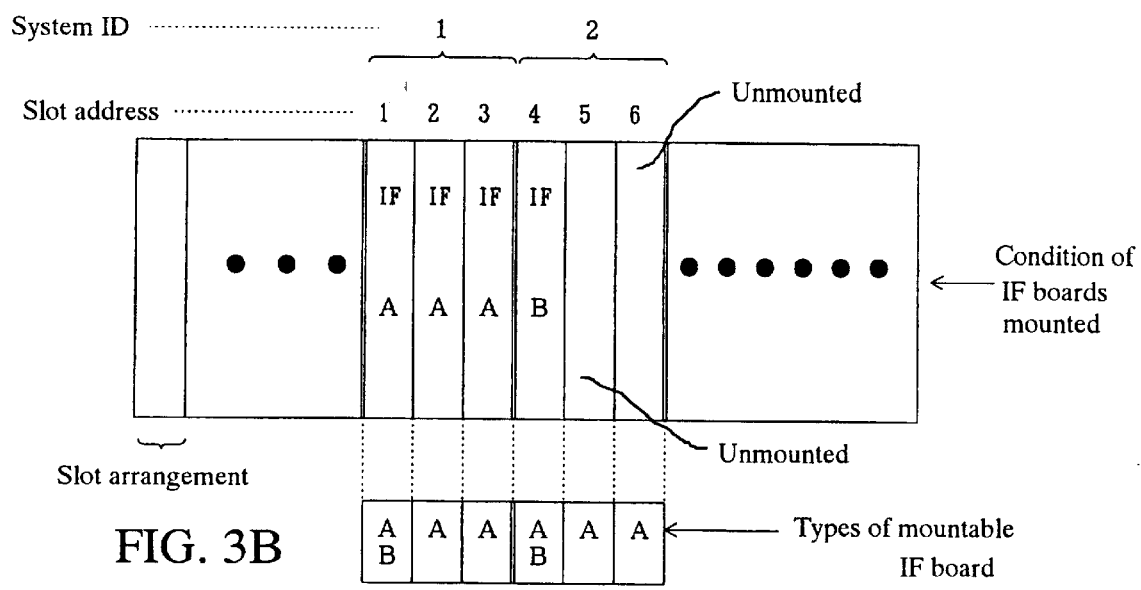
FIGS. 3A and 3B are conceptual diagrams showing the condition where the IF boards are mounted according to the present invention.

As is shown in FIG. 3, one system specified by a system ID is constituted by three slots. As is shown in FIG. 3B, only IF boards A can be mounted at slot addresses 2, 3, 5 and 6, which correspond to the slot arrangement in FIG. 3A, while either an IF board A or B can be mounted at slot addresses 1 and 4.

Because of the above positional relationship, the IF boards A and B are not mounted in the same system. If there are both IF boards A and B in the same system, they are erroneously mounted.

Figure 4:
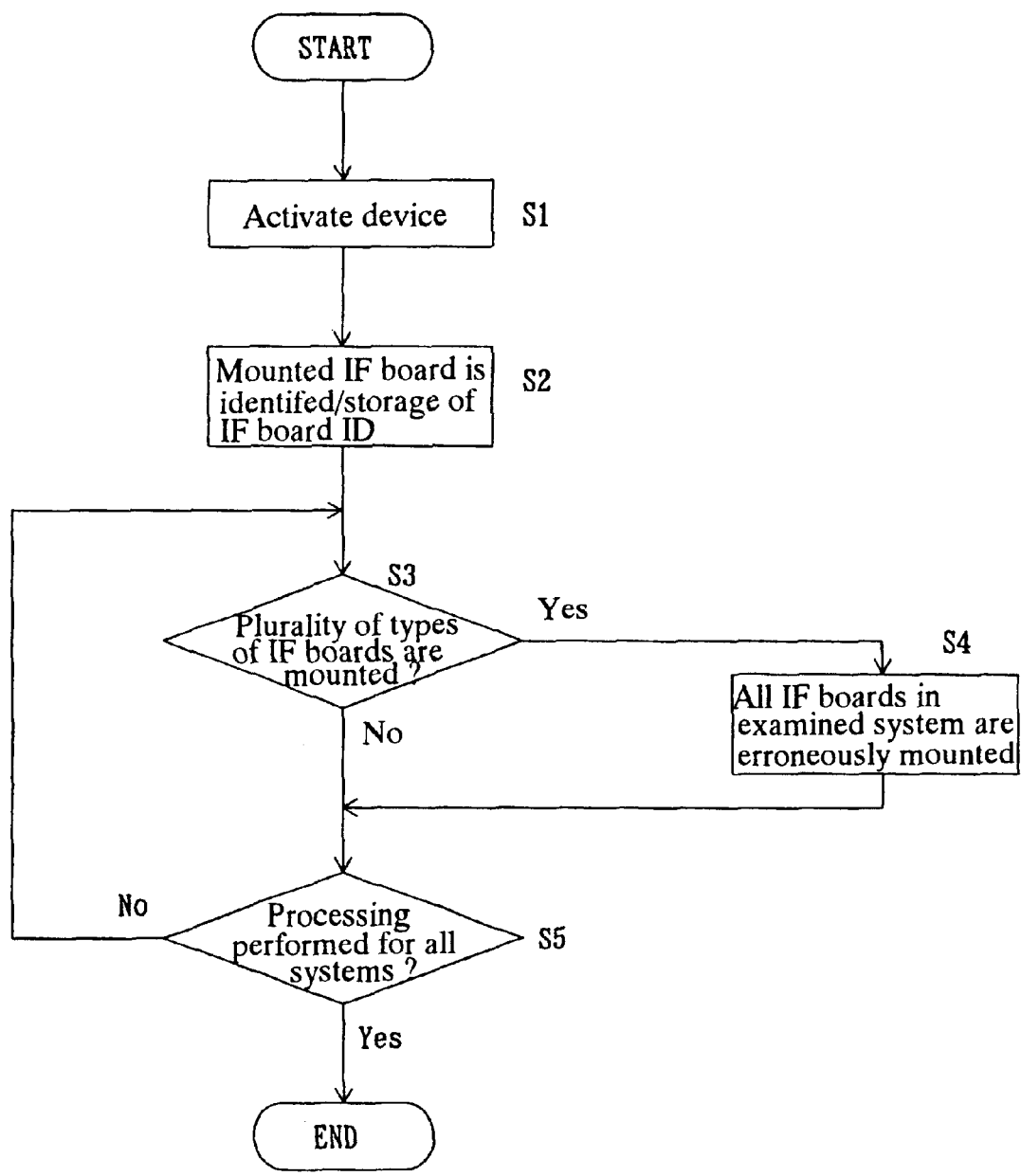
FIG. 4 is a flowchart of the processing performed by the thus described arrangement for the transmission device of the embodiment which is the basic concept of the present invention.

FIG. 4 is a flowchart of the processing performed by the thus described arrangement for the transmission device 1 of the embodiment which is the basic concept of the present invention. First, when the transmission device 1 is activated (step Si), the control processor 21 detects the presence of the IF boards mounted in the system 4, and initiates the collection of the IF board IDs from the IF board ID storage sections 51 on the mounted IF boards 5 (step S2).

Then, a check of each system 4 is performed by using the collected IF board IDs to determine whether or not a plurality of types of IF boards 5 are mounted therein (step S3). When the presence of a plurality of types of IF boards 5 is not detected in one system 4, the next system 4 is examined.

If the presence of a plurality of types of IF boards 5 is again detected, it is ascertained that all the IF boards 5 in the examined system 4 are erroneously mounted (step S4).

Then, the next system 4 is examined. This processing is performed for all the systems 4 in the transmission device 1 (step S5).

Figure 5:
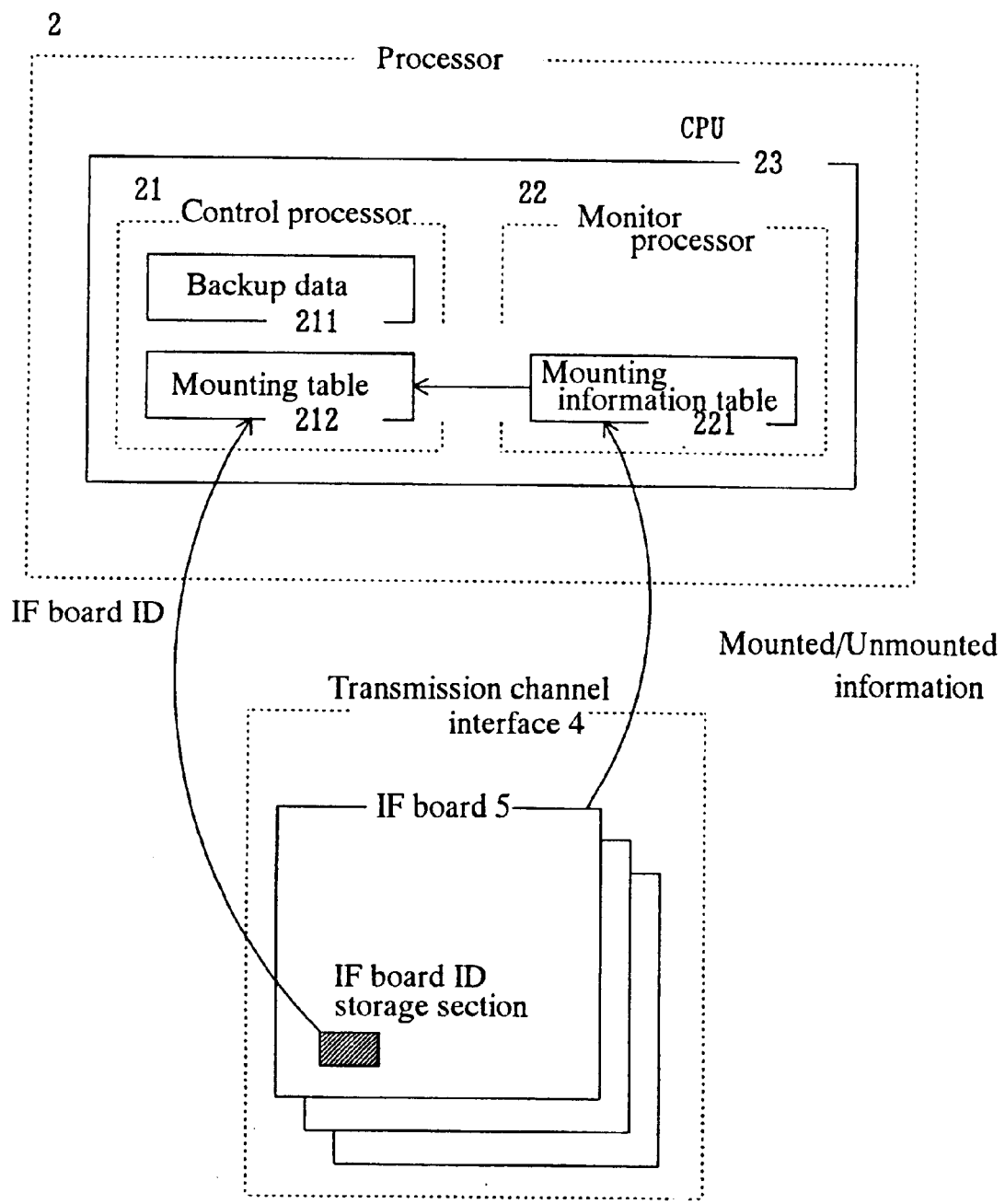
FIG. 5 is a block diagram for explaining a specific structure example for the arrangement shown in FIG. 1.

FIG. 5 is a block diagram for explaining a specific structure example for the arrangement shown in FIG. 1. The following features are added to the arrangement in FIG. 1, and only portions related to the features are shown in FIG. 5. The remainder of the structure is the same as that in FIG. 1.

In a processor 2 a single CPU 23 is responsible for the performance of the tasks allocated for a control processor 21 and a monitor processor 22. The functions of the control processor 21 and the monitor processor 22 are provided by software implementations executed by the CPU 23.

The control processor 21 manages backup data 211 and stores IF board IDs for each system while the transmission device 1 is in the operating state. In addition, the control processor 21 manages a mounting table 212. Therefore, the control processor 21 collects the latest IF board IDs from the IF board ID storage sections 51, which correspond to the IF boards 5 actually mounted in a system 4, and stores the IF board ID for each slot in the mounting table 212.

The monitor processor 22 manages a mounting information table 221 in which, separately from the table 212, it stores the mounted/unmounted states of all IF boards 5 in slots in the system 4.

Figure 6:
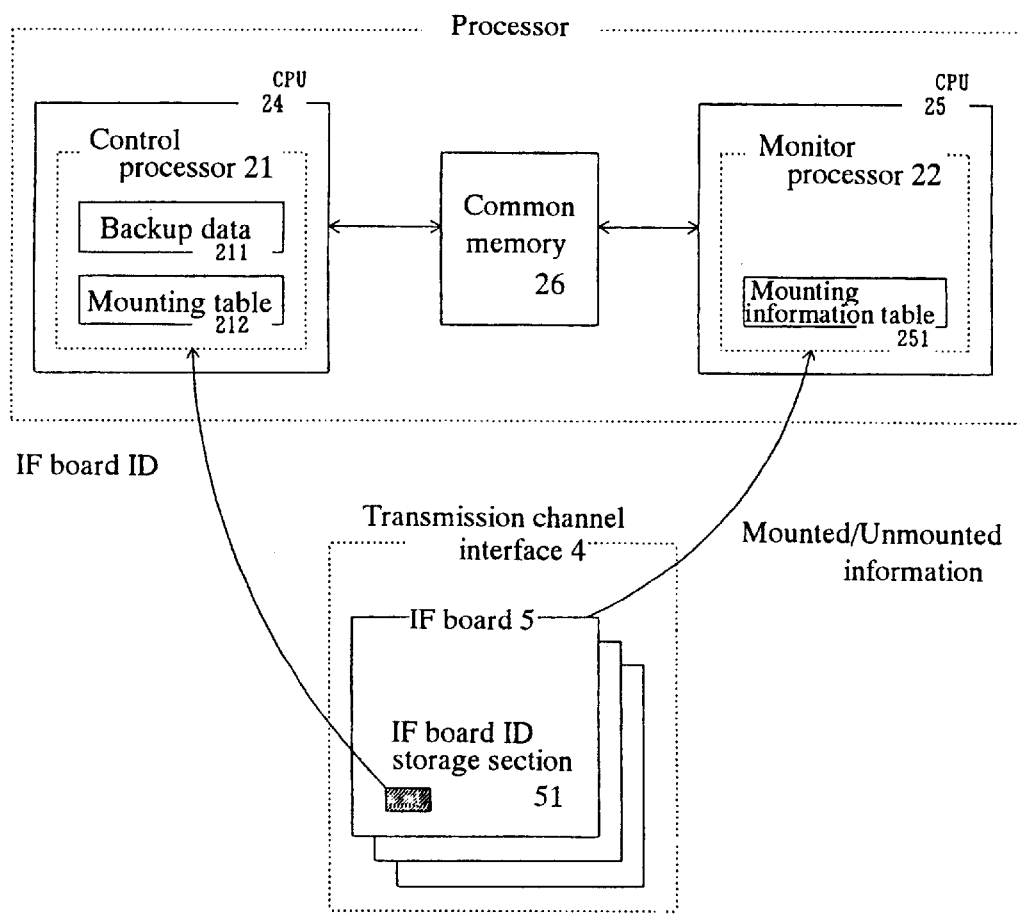
FIG. 6 is a block diagram for explaining the arrangement of another embodiment of the present invention, which is to be compared with the arrangement in FIG. 5.

FIG. 6 is a block diagram for explaining the arrangement of another embodiment of the present invention, which is to be compared with the arrangement in FIG. 5. A control processor 21 and a monitor processor 22 in a processor 2 are provided by using two independent CPUs 24 and 25.

A common memory 26 (specifically a DPRAM (Dual Port RAM)) is provided between the CPUs 24 and 25. The control processor 21 of the CPU 24 and the monitor processor 22 of the CPU 25 communicate with each other via the common memory 26. The remaining structure is the same as that shown in FIG. 5.

Figures 7A, 7B, 7C:
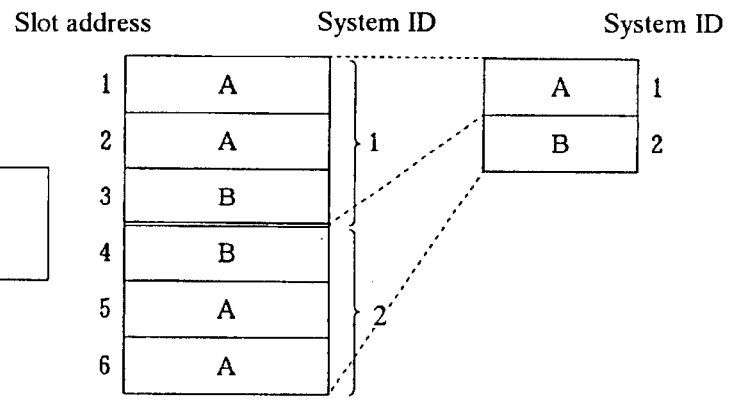
FIGS. 7A to 7C are diagrams for explaining the relationship between a backup table and a mounting table of a control processor in FIG. 5 or FIG. 6.

FIGS. 7A, 7B and 7C are diagrams for explaining the relationship between the backup table 211 and the mounting table 212 of the control processor 21 in FIG. 5 or 6. The contents of the backup table 211 are shown in FIG. 7A. The data for the IF board 5 mounting, which were measured previously, are stored for each system. In the example in FIGS. 7A to 7C, according to the mounting data previously obtained, IF board A is stored as backup data in a system 1, while IF board B is stored as backup data in a system 2.

The contents of the mounting table 212 before they are compared with the backup data are shown in FIG. 7B. The IF board IDs, of the mounted IF boards 5, collected by the control processor 21 are stored in the mounting table 212.

The contents of the mounting table 212, after they are compared with the backup data 211, are shown in FIG. 7C. The backup data 211 include one IF board ID for each system, and for each system a system ID is provided. In FIG. 7C, an A represents the IF board ID of an IF board A, and a B represents the IF board ID of an IF board B.

As previously described, an IF board A and an IF board B are not both mounted in a single system. Therefore, as a result of the comparison of the contents of the mounting table 212 in FIG. 7B with those of the backup data 211 in FIG. 7A, it is found that the IF board B inserted in the third slot in the system 1 is erroneously mounted, and that the IF boards A inserted in the second and the third slots in the system 2 are erroneously mounted.

In this case, as is shown in FIG. 7C, the slots for the erroneously mounted IF boards are defined as being empty.

FIG. 8 is a diagram for explaining the relationship between the mounting table 212 in the control processor 21 and the mounting information table 251 in the monitor processor 22.

Figures 8A, 8B, 8C:
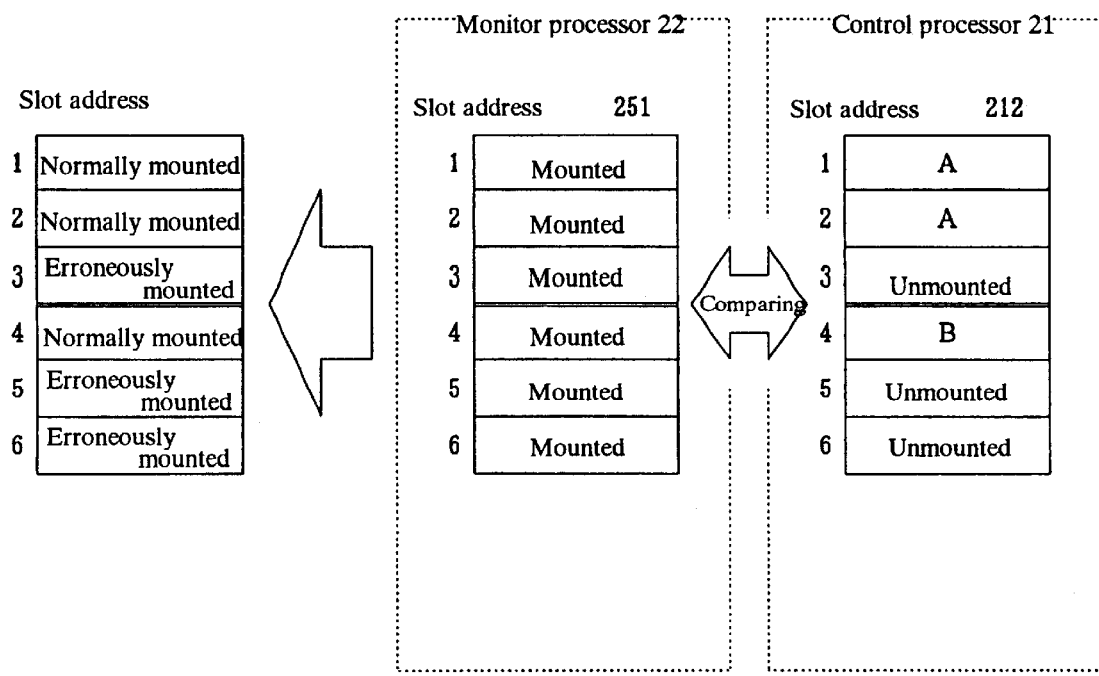
FIGS. 8A to 8C are diagrams explaining the relationship between the mounting table in the control processor and a mounting information table in a monitor processor of FIG. 5 or FIG. 6.

The contents of the mounting table 212 are shown in FIG. 8A. The processing in FIGS. 7A to 7C are performed by comparing the contents of the mounting table 212 with the backup data 211. Thus, as is shown in FIG. 7C, the contents of the table 212 are updated after they are compared with the backup data 211.

The contents of the mounting information table 221 are shown in FIG. 8B. In the mounting information table 221 is stored information, concerning the individual slots in the line interface (system) 4, which is collected by the monitor processor 25 for the monitoring of the mounted or unmounted states of the IF boards 5.

In FIG. 8C are shown the results obtained when the monitor processor 22 compares the contents of the mounting table 212 in FIG. 8A with the contents of the mounting information table 221 in FIG. 8B. For example, slot address 3 in the mounting table 212 is shown as empty, while corresponding slot address 3 in the mounting information table 221 is shown as occupied. Therefore, in FIG. 8C, slot address 3 is determined to be erroneous mounting.

In FIGS. 8A to 8C, as well as in FIGS. 7A to 7C, an A represents the IF board ID for an IF board A, and a B represents the IF board ID for an IF board B.

The role of the common memory 26 and the advantages obtained by using the CPU will now be described while again referring to FIG. 6.

The two CPUs that respectively constitute the control processor 24 and the monitor processor 25 copy the most recently stored data to the common memory 26. The CPUs exchange data by reading data from the common memory 26.

That is, in the arrangement shown in FIG. 6, the common memory 26 is a readable/writable dual port RAM for the CPUs constituting the control processor 24 and the monitor processor 25. Each time the contents of the information storage sections (the backup data 211 and the mounting table 212 for the control processor 12 and the mounting information table 221 for the monitor processor 22) are updated, the individual processors copy the updated data to the common memory 26.

Figure 9:
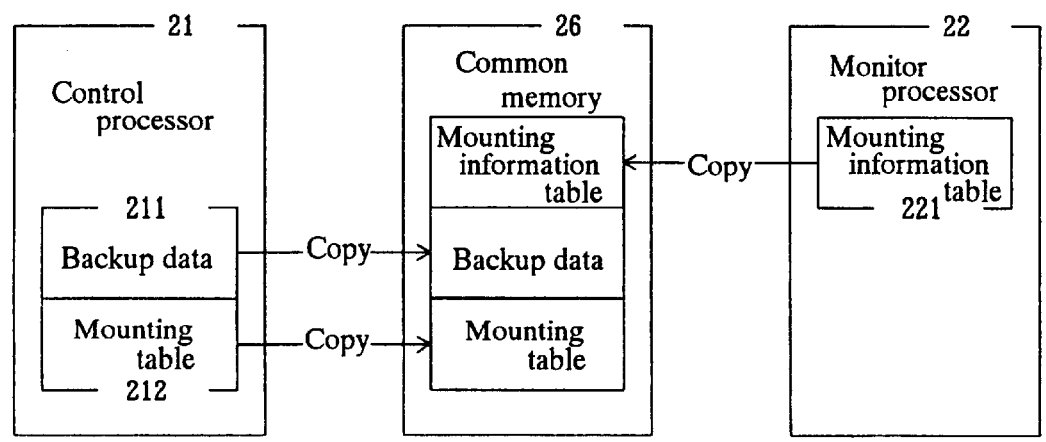
FIG. 9 is a diagram for an example wherein copies of the latest information stored in the control processor and the monitor processor are coexistent in the common memory.

Therefore, copies of the latest information stored in the control processor 21 and the monitor processor 22 are continuously coexistent in the common memory 26, as is shown in FIG. 9. When one CPU is to refer to information stored in the other CPU, it need only read the information concerning the other CPU stored in the common memory 26.

Figure 10:
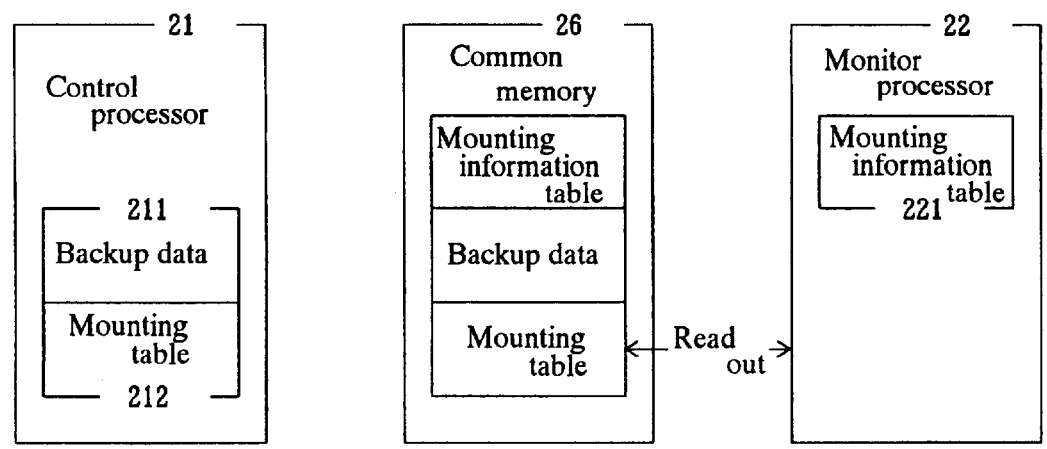
FIG. 10 is a diagram for an example wherein the monitor processor refers to the mounting table of the control processor.

FIG. 10 is a diagram for an example wherein the monitor processor 22 refers to the mounting table 212 of the control processor 21.

When the common memory 26 is employed in the above described manner, the processing for the exchange of data by the CPUs can be simplified and CPU power losses can be reduced. In addition, all data can be referred to, regardless of the state of the CPU which stored the data.

These advantages can be rephrased as follows. Assume that the control processor 21 and the monitor processor 22 are provided by independent CPUs but that the common memory 26 is not employed. If the monitor processor 22 refers to the mounting table 212 stored in the control processor 21, both of the processors, i.e., the CPUs, must engage in communication by employing the following procedures.

(1) The monitor processor 22 transmits a request to refer to the table 212 to the control processor 21, and waits for a response.

(2) The control processor 21 receives the request from the monitor processor 22, and transmits the contents of the mounting table 212 to the monitor processor 22.

(3) The monitor processor 22 receives the information from the control processor 21.

In this case, since not only the CPU which refers to the information (the monitor processor 22 in the above example) must shift to the wait state, but also the CPU which provides the information to be referred to (the control processor 21 in the above example) must perform a process "for receiving an information request and responding to it," a loss of CPU power is caused.

On the other hand, when the common memory 26 is employed, the monitor processor 22 need only read from the common memory 26 a copy of the contents of the mounting table, and no communication with the control processor 21 is required. Therefore, regardless of the state of the control processor 21, the information stored in the control processor 21 can be referred to.

In addition, there is a tradeoff between the sizes and the processing capabilities of the control processor 21 and the monitor processor 22, and an explanation will be given for a case wherein a single CPU is employed and for a case wherein two CPUs are employed in order to cope with requests from clients concerning the arrangement of the device.

When the processor is provided by a single CPU, this contributes to a reduction in size and to a savings in space because the number of CPUs is reduced and the number of packages constituting the processor is also smaller than when there are two CPUs employed. It should be noted that the control and monitor processes are both performed by a single CPU, and that the processing capability is less than it is when two CPUs are employed.

When the processor is provided by two CPUs, the load imposed on each CPU can be reduced by distributing the processing, and the processing capability is greater than it is when a single CPU is employed. It should be noted, however, that the number of packages is increased in accordance with the increase in the CPUs, and that the device is larger than is the device wherein a single CPU is employed.

While taking the above features into account, the method for determining an erroneous mounting can cope with either case, in which either a single CPU is employed or in which two CPUs are employed, and can flexibly handle requests (the downsizing of the device, the enhancement of the processing speed, etc.) from a client concerning the arrangement of the device.

Figure 11:
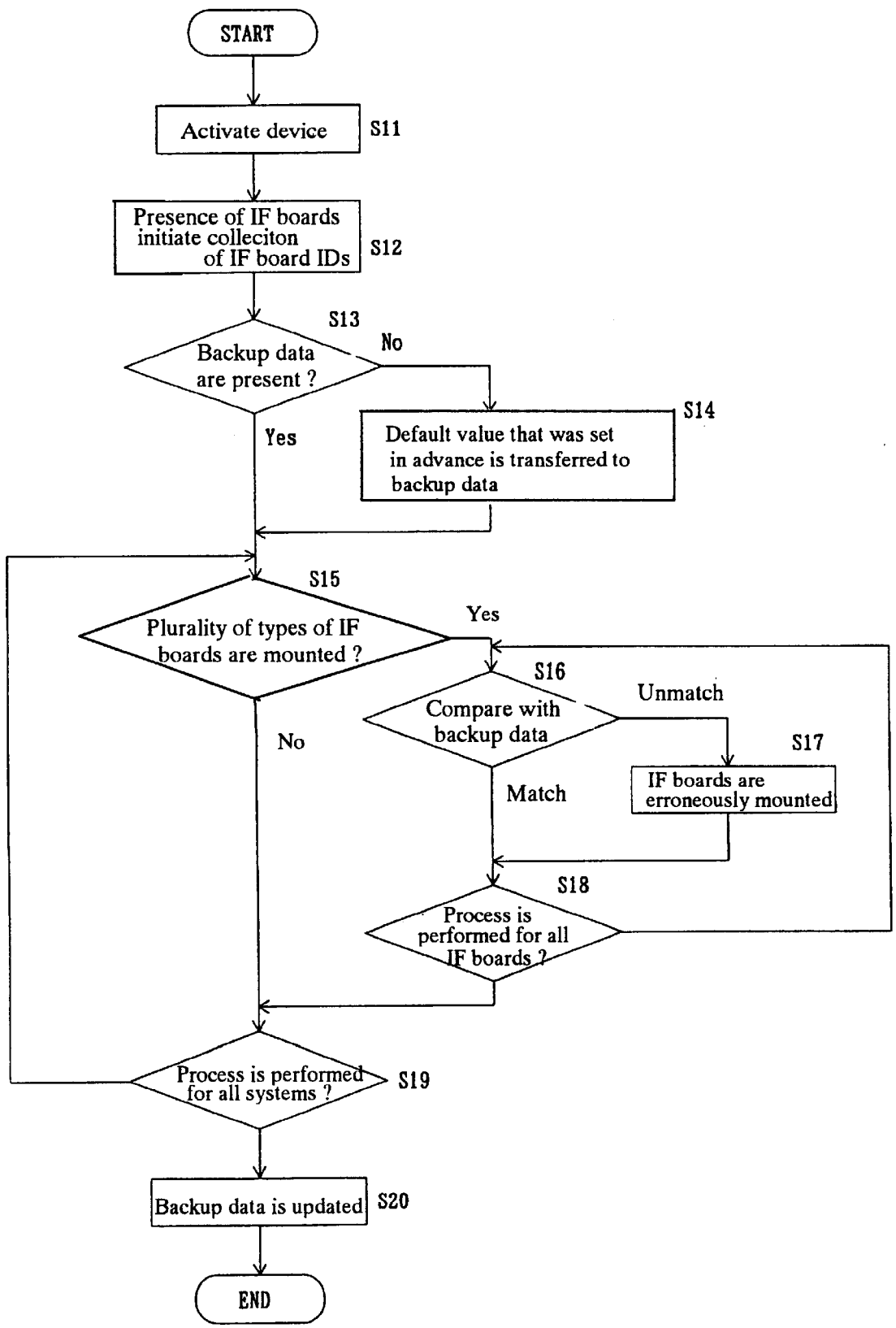
FIG. 11 is a flowchart for the embodiment in FIGS. 5 to 8.

FIG. 11 is a flowchart for the embodiment in FIGS. 5 to 8. When the transmission device is activated (step the control processor 21 detects the presence of the IF boards 5 mounted in the systems 4, and initiates the collection of the IF board IDs from the IF board ID storage sections 51 of the mounted IF boards 5 (step S12). The collected IF board IDs are stored in the mounting table 212, as is shown in FIG. 7B.

The control processor 21 examines all the systems to determine whether there are any backup data 211, including the IDs of mounted IF boards, that are collected during the previous operation (step S13). If backup data 211 are present, the control processor 21 employs that backup data 211. If no backup data 211 are present, it is assumed that the transmission device 1 was newly activated, and a default value that was set in advance is transferred to the backup data (step S14).

When the system 1 is viewed as a specific example, the control processor 21 employs the previously collected IF board IDs to examine the mounting table 212 and to determine whether or not a plurality of types of IF boards 5 coexist in the system 1 (step S15). When the coexistence of a plurality of types of IF boards is not detected, the next system is examined.

If the coexistence of a plurality of types of IF boards 5 is detected, the IDs of the IF boards 5 mounted in each system are compared with the IF board IDs, assembled during the previous operation of the system, that are contained in the backup data (step S16). When the IDs match, it is ascertained that the mounted IF boards 5 are normally mounted. When the IDs do not match, it is ascertained that the IF boards 5 are erroneously mounted (step S17). The above described process is performed for all the IF boards 5 (step S18).

In the example in FIG. 7, the control processor 21 examines the mounting table 212 to determine whether a plurality of types of IF boards 5 are present in the system 1, and detects any coexistence of IF boards A and B. Therefore, the control processor 21 compares the contents of slot addresses 1 to 3 in the mounting table 212 with the contents of system ID 1 (IF board A) in the backup data 212, and determines that there is no IF board ID match for the slot at slot address 3 (FIG. 7B).

In this fashion, the IF board B mounted at slot address 3 is determined to be erroneously mounted, and the remark recorded in the mounting table 212 for slot address 3 is updated to unmounted (FIG. 7C).

The monitor processor 22 compares the updated mounting table 212 (FIG. 8A) with the mounting information table 221 (FIG. 8B), and ascertains that the mounted states do not match at slot address 3. Therefore, the IF board at slot address 3 is determined to be erroneously mounted (FIG. 8C).

The above process is performed for all the systems in the transmission device 1 (step S19), and the mounted condition of each system is stored in the backup data 211 (step S20). When the mounted states of the IF boards are changed during the operation of the device (a new IF board is mounted or a mounted IF board is removed), the backup data 211 are updated.

Assuming that the above processing is performed for the system 2 in the example in FIG. 7, the control processor 21 examines the mounting table 212 to determine whether a plurality of types of IF boards coexist in a system, and detects the coexistence of IF boards A and B.

The control processor 21 compares the contents at slot addresses 4 to 6 in the mounting table 212 with the contents of system ID 2 (IF board B) in the backup data 211. As a result of the comparison, it is ascertained that the IF board IDs for boards at slot addresses 5 and 6 do not match.

Therefore, the IF boards A mounted at slot addresses 5 and 6 are determined to be erroneously mounted, and the state for slot addresses 5 and 6 is changed to unmounted in the mounting table 212 (FIG. 7C).

The monitor processor 22 compares the updated mounting table 212 (FIG. 11A) with the mounting information table 221 (FIG. 11B), ascertains that the mounted states at slot addresses 5 and 6 do not match, and determines that the IF boards in the slots are erroneously mounted.

In the embodiment shown in FIGS. 5 to 8, when it is determined that a plurality of types of IF boards 5 are mounted in the same system, as the result of a comparison with backup data, the IF boards 5 whose types are matched are determined to be normally mounted, and the IF boards 5 whose types are not matched are determined to be erroneously mounted.

Figure 12:
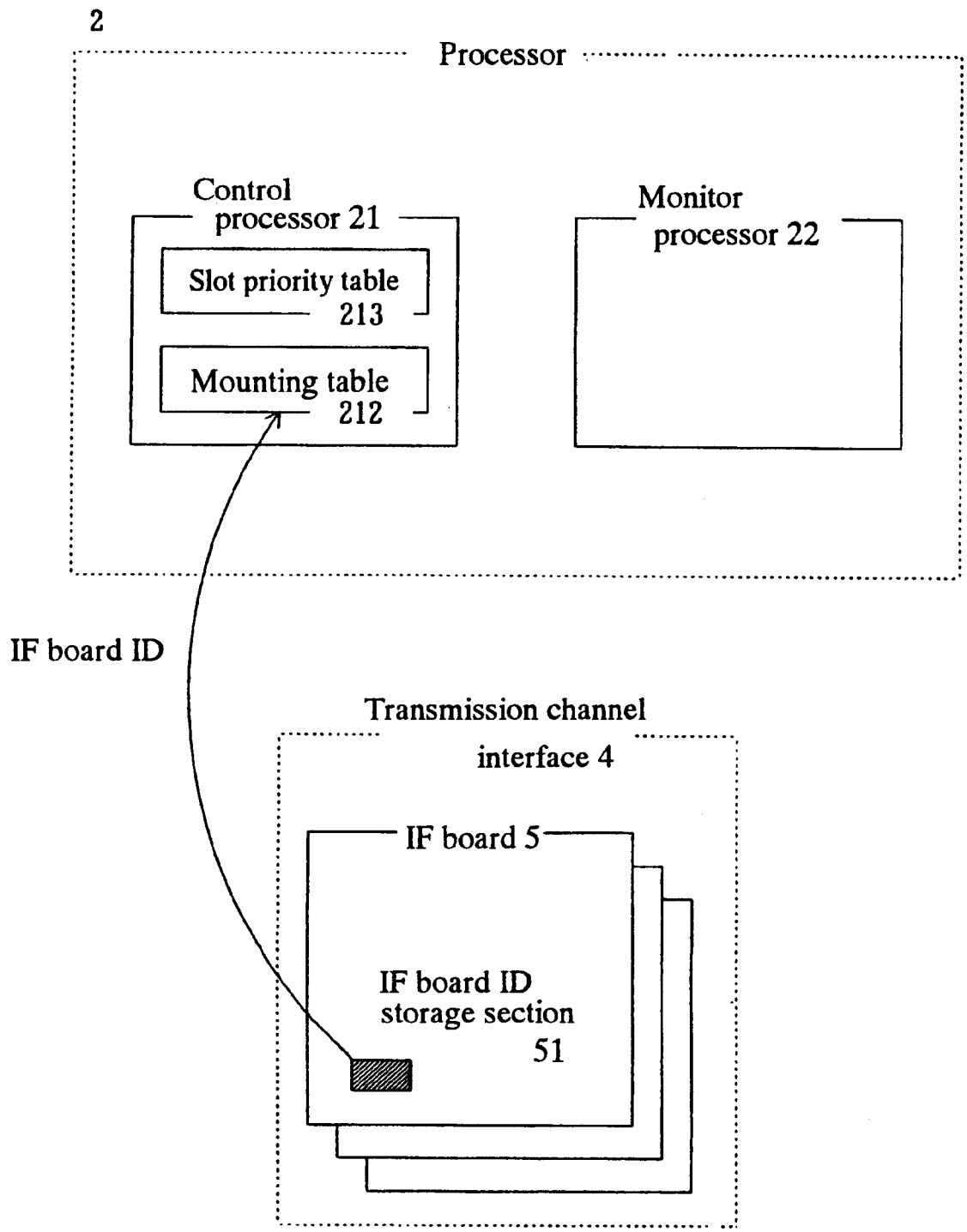
FIG. 12 is a block diagram illustrating the arrangement for an additional embodiment of the present invention corresponding to the embodiment in FIG. 5.

FIG. 12 is a block diagram illustrating the arrangement for an additional embodiment of the present invention corresponding to the embodiment in FIG. 5. A slot priority table 213 is managed by a control processor 21 in a processor 2. The slot priority table 213 is employed for a system 4 to store the priority order of each slot defined in advance.

The processing concerning the priority order of slots is performed by referring to the slot priority table 213. The other arrangements are the same as those for the embodiment in FIG. 5.

Figures 13A, 13B, 13C:
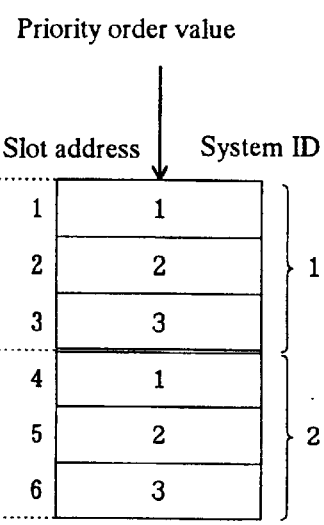
FIGS. 13A to 13C are diagrams for explaining the relationship between a slot priority table and a mounting table in FIG. 12.

FIG. 13 is a diagram for explaining the relationship between the slot priority table 213 and a mounting table 212 in FIG. 12. Example contents in the slot priority table 213 are shown in FIG. 13A. The numbers in the slot priority table 213 indicate the priority order of the mounted slots in the system, and are defined in the ascending order or the descending order (in the example in FIG. 13A the ascending order is used).

The contents of the mounting table 212 are shown in FIG. 13B. As the result of a comparison of the mounting table 212 with the slot priority table 213, the IF board A is found to be mounted in the system 1 contrary to the priority order, and is determined to be erroneously mounted, as is shown in FIG. 13C.

Figure 14:
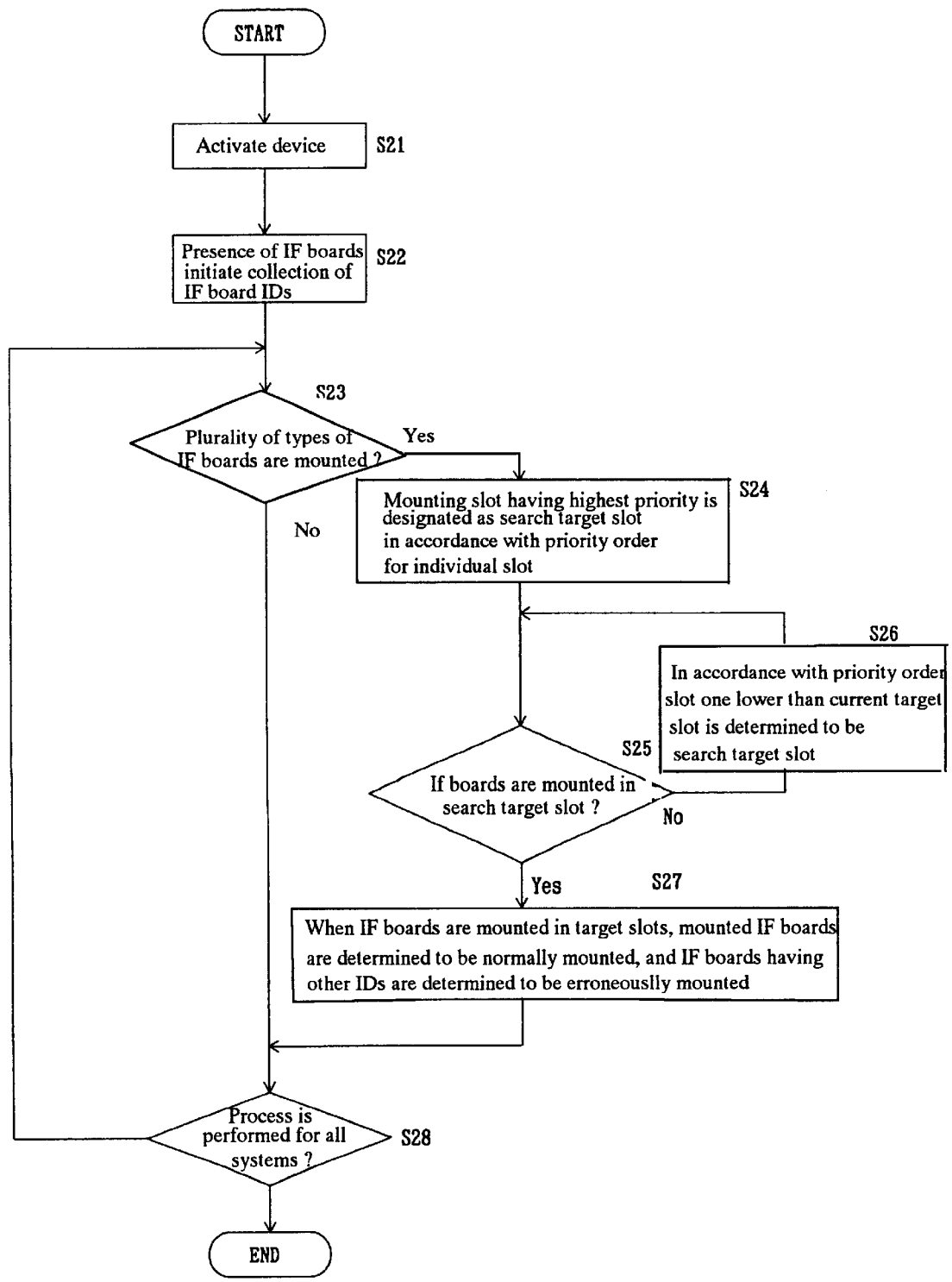
FIG. 14 is a flowchart for explaining the processing in the embodiment in FIG. 12.

FIG. 14 is a flowchart for explaining the processing in the embodiment in FIG. 12. In FIG. 14, when the device is activated (step S21), the control processor 21 identifies the IF boards 5 mounted in the system 4. Further, the control processor 21 initiates the collection of IF board IDs for the mounted IF boards 5 from IF board ID storage sections 51 (step S22). The IF board IDs which are collected are stored in the mounting table 212.

Then, the collected IF board IDs are employed to determine whether a plurality of types of IF boards 5 coexist in each system (step S23). When the coexistence of a plurality of IF boards 5 is not detected, the next system is examined. When the coexistence of a plurality of types of IF boards 5 is detected, the mounted slot having the highest priority is designated as a search target slot in accordance with the priority order for individual slots, which is defined in the system and stored in the slot priority table 213 (step S24).

When the system 1 is observed in accordance with the example in FIG. 13, the mounting table 212 is examined to determine whether a plurality of types of IF boards 5 coexists in system 1, and the coexistence of the IF boards A and B is detected.

The slot priority table 213 is referred to, and a slot at slot address 1 is determined to be a search target slot. The mounting table 212 is examined to determine that the IF board B is mounted in the search target slot (slot address 1).

For all the IF boards 5 mounted in the system 1, in the mounting table 212 the IF boards B are determined to be normally mounted and the IF boards 5 having the other IDs are determined to be erroneously mounted.

Following this, a check is performed to determine whether or not IF boards 5 are mounted in the search target slot (step S25). If no IF boards 5 are mounted in the search target slot, in accordance with the priority order a slot one lower than the current target slot is determined to be a search target slot (step S26), and a process at step S25 is performed.

When IF boards 5 are mounted in the target slots, the mounted IF boards 5 are determined to be normally mounted, and the IF boards 5 having the other IDs are determined to be erroneously mounted (step S27). The above process is performed for all the systems 4 (step S28).

For system 2, the mounting table 212 is examined to determine whether a plurality of types of IF boards 5 coexist in the system 2, and the coexistence of the IF boards A and B is detected.

The slot priority order table 213 is referred to, and a slot at slot address 4 that has the highest priority is determined to be a search target slot.

In the mounting table 212, it is detected that the state of the search target slot (slot address 4) is unmounted. The slot priority table 213 is referred to, and a slot at slot address 5 that has the second highest priority, is determined to be a search target slot.

In the mounting table 212, it is found that IF board A is mounted in the search target slot (slot address 5).

Finally, the results shown in FIG. 13C can be obtained.

As a result, when a plurality of types of IF boards 5 coexist in each system of a transmission device, the IF board types mounted in slots having a higher priority can be determined to be normally mounted, and IF board types mounted in slots having a lower priority can be determined to be erroneously mounted.

Figure 15:
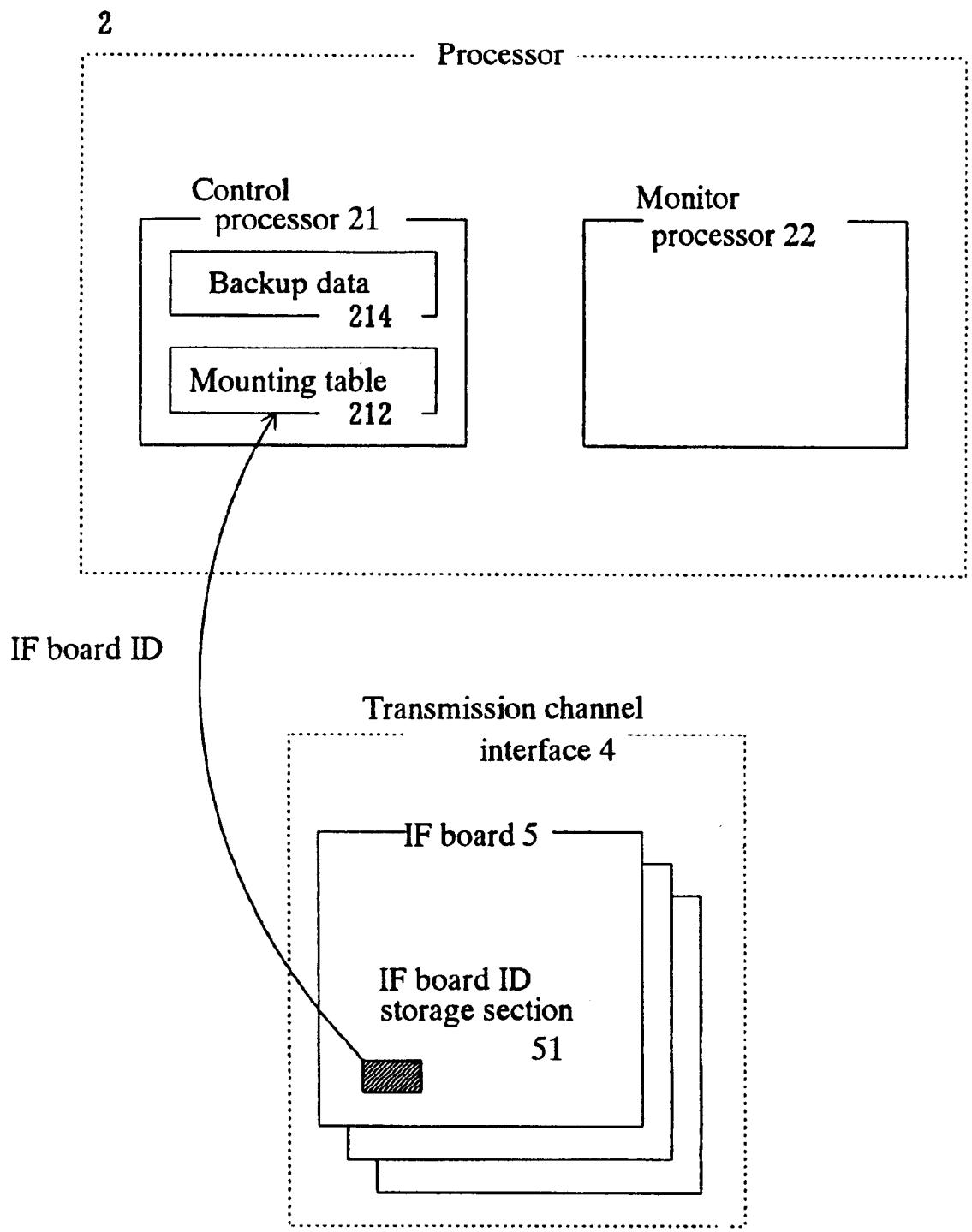
FIG. 15 is a diagram for a further embodiment of the present invention corresponding to that in FIG. 5.

FIG. 15 is a diagram for a further embodiment of the present invention corresponding to that in FIG. 5. In this embodiment, an IF board priority table 214 is provided for a control processor 21. In the IF board priority table 214, a priority order which is managed by the control processor 21 and is defined in advance is stored for each IF board 5 type that can be mounted in the device. The process concerning the provision of the priority order for each IF board 5 type is performed by referring to the IF board priority table 214. The other arrangement is the same as that in FIG. 12.

FIGS. 16A to 16B are diagrams for explaining the IF board priority table 214.

As is shown in FIG. 16A, one IF board ID for each priority is stored in the IF board priority table 214. The lowest priority is given for a stopper according to a specific pattern. The contents in a mounting table 212 are shown in FIG. 16B, and the results are shown in FIG. 16C.

The determination process will now be explained while referring to the flowchart in FIG. 17 corresponding to FIG. 15. When a transmission device 1 is activated (step S31), the control processor 21 identifies the IF boards 5 mounted in a system 4, and initiates collection of IF board IDs from IF board ID storage sections 51 of the mounted IF boards 5 (step S32). The collected IF board IDs are stored in the mounting table 212 (see FIG. 16B).

At step S32, the IF board IDs collected and stored in the mounting table 212 are employed to determine whether or not a plurality of types of IF boards 5 coexist in each system (step S33).

When the coexistence of a plurality of types of IF boards 5 is not detected, the next system is examined. In the embodiment in FIG. 16A, a plurality of types of IF boards A and B are mounted in system 1.

Therefore, this is a case where a plurality of IF board 5 types are detected, the IF board ID having the highest priority is set as a search target IF board ID by referring to the IF board priority order, which is defined in advance in the IF board priority table 214 (step S34). In the example in FIG. 16A, the IF board A having the highest priority is set as a search target.

The search target IF board ID is examined for all the mounted IF boards 5 in the system 4 (step S35). That is, in the example in FIG. 16A, the mounting table 212 is employed to examine all the mounted IF boards 5 in the system 4 for the search target IF board ID (IF board A).

When the search target IF board ID is not detected, an IF board ID one step lower than the current search target IF board ID is set as a search target IF board ID in accordance with the priority order for the IF board IDs (steps S36 and S37).

When the search target IF board 5 type is detected, IF boards 5 having the pertinent IDs are determined to be normally mounted, and IF boards 5 having the other IDs are determined to be erroneously mounted (steps S36 and S38).

In the example in FIG. 16A, the search target IF board ID (IF board A) for system 1 is detected at slot address 3. Then, in the mounting table 212, IF boards A are determined to be normally mounted (slot address 3) and the other IF boards 5 are determined to be erroneously mounted (slot address 1).

The processes at steps S33 to S38 are performed for all the systems in the transmission device 1 (step S39). Similarly, for system 2, the mounting table 212 in FIG. 16B is examined to determine whether a plurality of IF boards are present in system 2. The coexistence of IF boards A and B is detected.

The IF board A having the highest priority is set as a search target IF board ID by referring to the IF board priority table 214 in FIG. 16A. In the mounting table 212, all the IF boards 5 mounted in the system 2 are examined for the search target IF board ID (IF board A).

As a result, the search target IF board IDs (IF boards A) are detected at slot addresses 4 and 5. As is apparent from the results shown in FIG. 16C, in the mounting table 212 the IF boards A are determined to be normally mounted (slot addresses 4 and 5) and an IF board having another ID is determined to be erroneously mounted (slot address 6).

Through the above processing, when a plurality of types of IF boards 5 are mounted in each system of the transmission device, the IF board types having higher priorities can be determined to be normally mounted, and the IF board types having lower priorities can be determined to be erroneously mounted.

Figure 17:
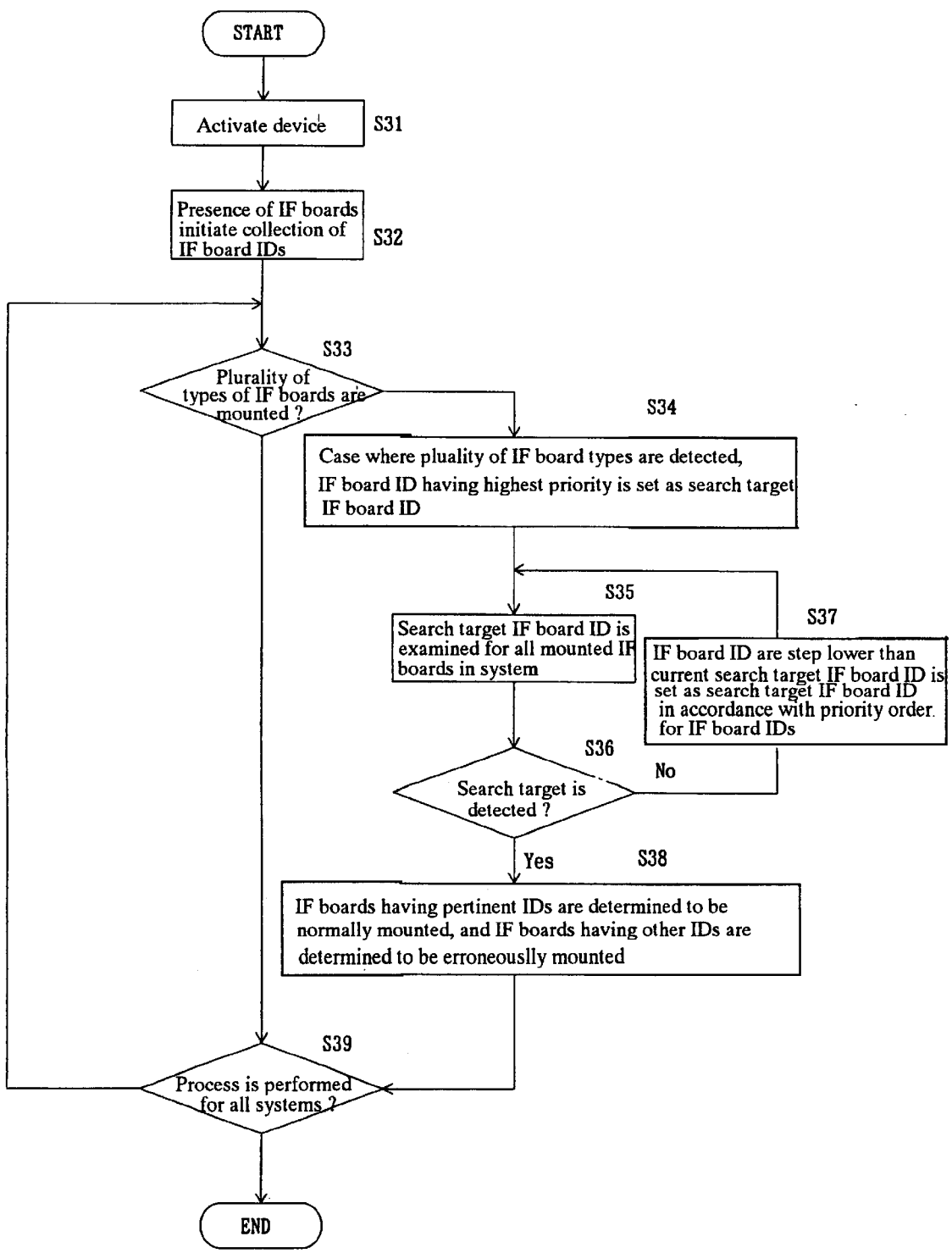
FIG. 17 is a flowchart of determination process corresponding of FIG. 15.

It should be noted that when, at steps S34 to S37 in FIG. 17, the IF board IDs are examined in the descending priority order and the search target IF board ID is a stopper pattern, the search process is terminated.

Figure 18:
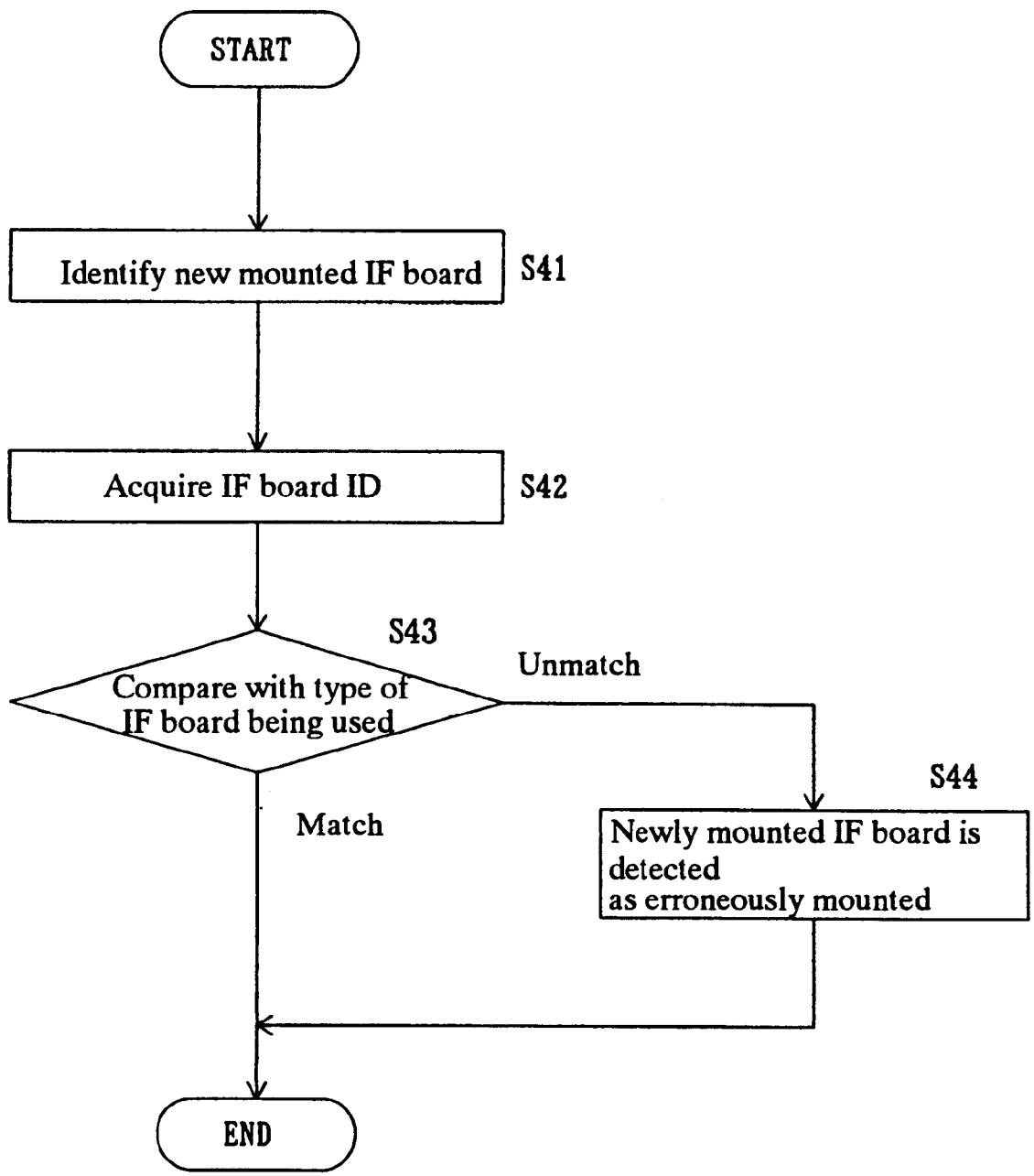
FIG. 18 is a flowchart for the processing, for still another embodiment of the present invention performed when a new IF board is mounted during the normal operation of a transmission device.

FIG. 18 is a flowchart for the processing, for still another embodiment of the present invention, performed when a new IF board 5 is mounted during the normal operation of a transmission device 1. When a new IF board 5 is mounted a control processor 21 identifies that activity (step S41), and acquires an IF board ID for the new IF board 5 from an IF board ID storage section 51 on that IF board 5 (step S42).

The obtained IF board ID is compared with an IF board ID currently being used by a system wherein the new IF board 5 is mounted (step S43). When the IDs match, it is assumed that a correct, additional IF board is mounted, and the processing is terminated. When the IDs do not match, it is assumed that the newly mounted IF board is incorrect (step S44).

As a result, when a new IF board 5 is mounted in a system during the operation of a transmission device 1 and when the type of the new IF board differs from an IF board already mounted, the previously mounted IF board can be determined to be normally mounted, and the added IF board can be determined to be erroneously mounted.

Figure 19:
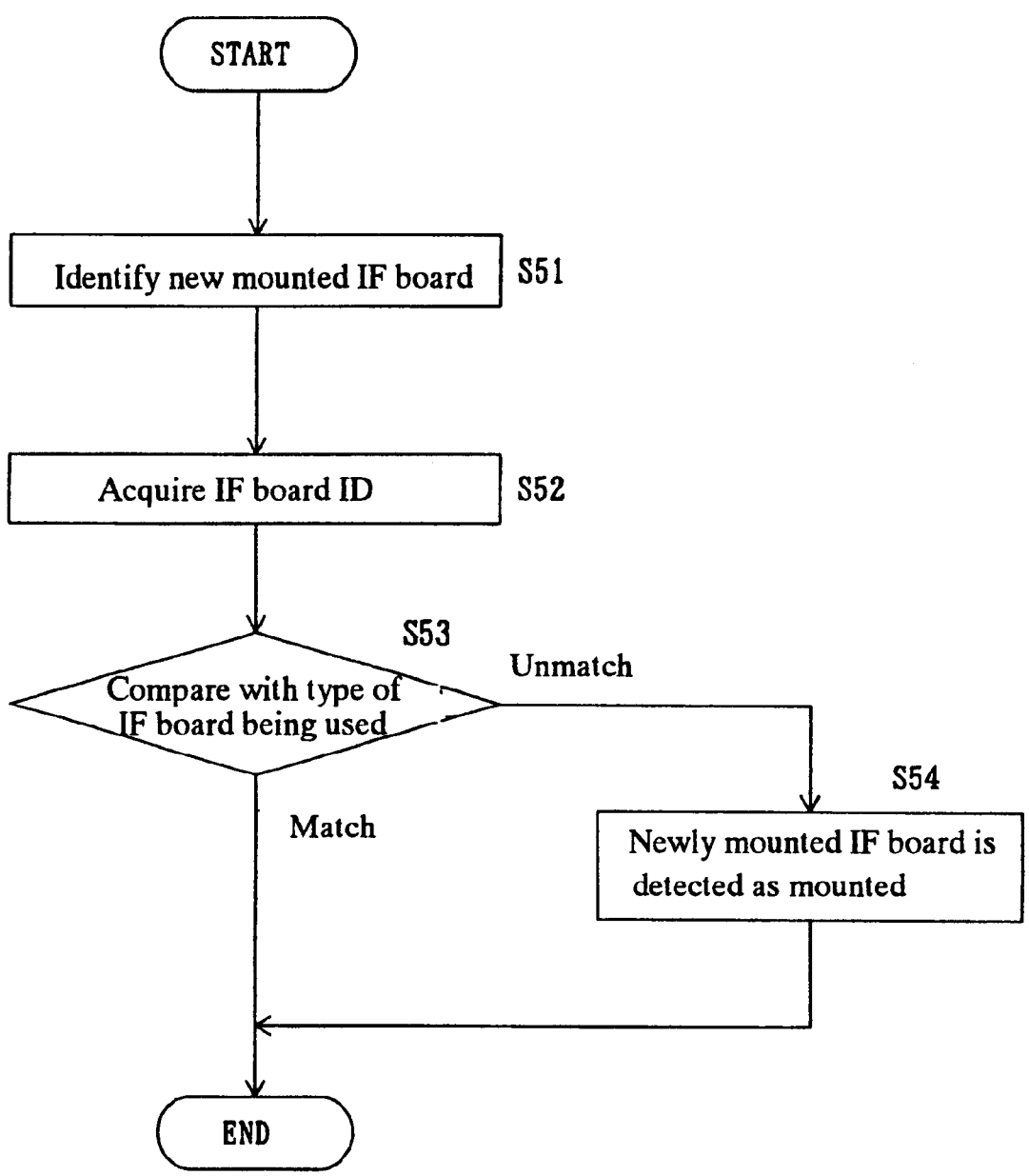
FIG. 19 is a flowchart for still another embodiment of the present invention.

FIG. 19 is a flowchart for still another embodiment of the present invention. When a new IF board 5 is mounted during the normal operation of a transmission device 1 having the arrangement in FIG. 1, a control processor 21 identifies that activity (step S51) and acquires the IF board ID of the newly mounted IF board 5 from an IF board ID storage section 51 on that IF board 5 (step S52).

The obtained IF board ID is compared with an IF board ID which is currently being employed in the system wherein the new IF board 5 has been mounted (step S53). When the IDs match, it is assumed that a correct, additional IF board 5 has been mounted, and when the IDs do not match, it is assumed that the IF board 5 that has already been mounted and is currently being used is erroneously mounted (step S54).

As a result, when a new IF board 5 is mounted in a system during the operation of a transmission device 1, and when the type of the new IF board differs from the type of an IF board already mounted in the system, the newly mounted IF board 5 can be determined to be normally mounted, and the previously mounted IF board 5 can be determined to be erroneously mounted.

Figure 20:
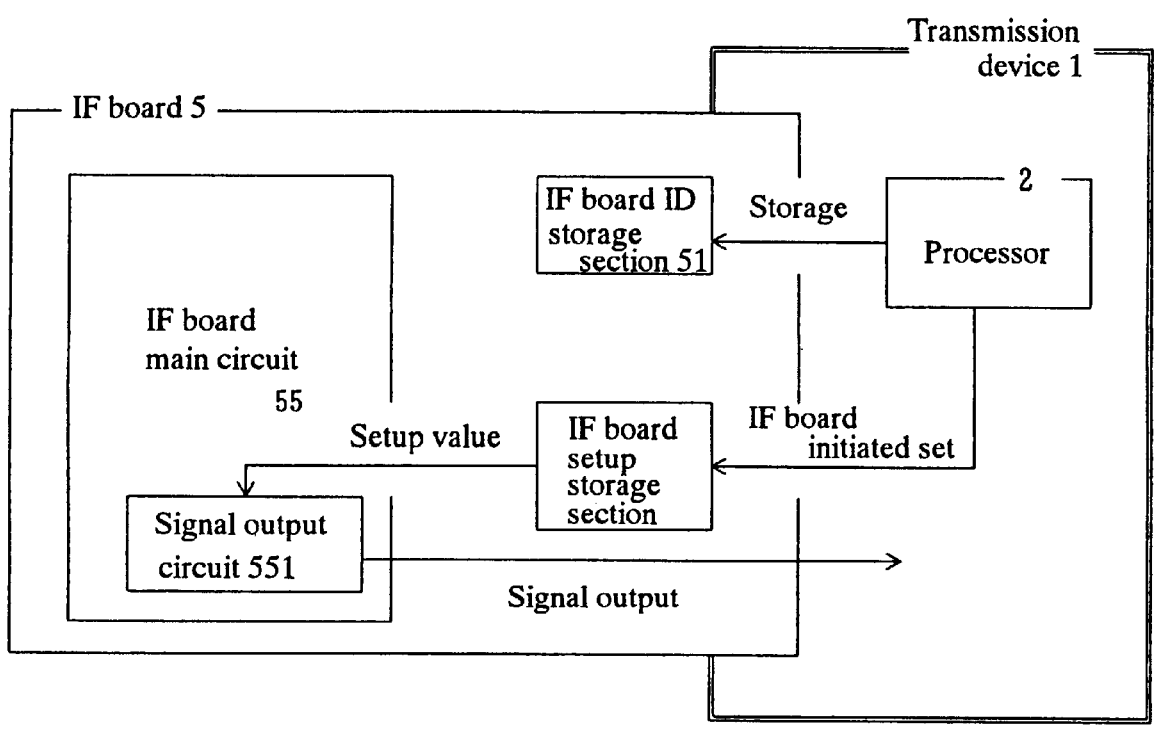
FIG. 20 is a detailed block diagram illustrating an example arrangement of an IF board according to the present invention.

FIG. 20 is a detailed block diagram illustrating an example arrangement of an IF board 5 according to the present invention.

In FIG. 20, an IF board main circuit 55 in the IF board 5 has the IF board primary functions, such as a function for relaying a primary signal to be transmitted to a transmission device 1.

A signal output circuit 551 receives a setup value from an IF board setup storage section 56, and outputs a signal to the transmission device 1. The IF board setup storage section 56 is constituted by, for example, a DRAM. The IF board storage section 56 stores various setups employed by a processor to operate the IF board 5, and transmits them to the signal output circuit 551. The other arrangement is the same as that in the embodiment shown in FIG. 1.

Figure 21:
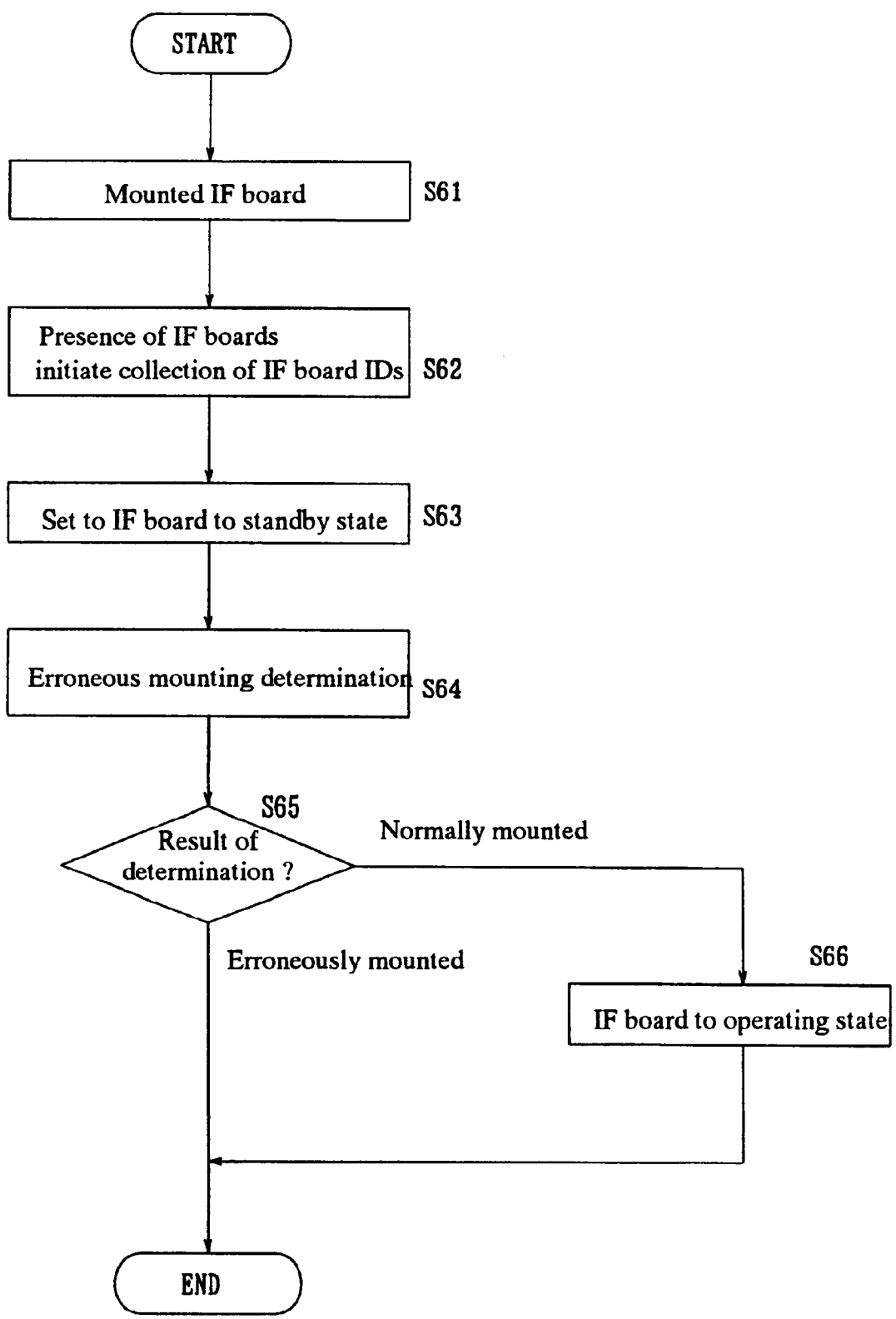
FIG. 21 is a flowchart of the process performed by the arrangement in FIG. 20.

FIG. 21 is a flowchart of the process performed by the arrangement in FIG. 20. When the IF board 5 is mounted in the transmission channel interface 4 or the IF board is already mounted, and when the transmission device 1 is activated (step S61), the control processor 21 detects the mounting of the IF board 5, and acquires the IF board ID for the mounted IF board 5 from the If board ID storage section 51 of that IF board 5 (step S62).

At the time the IF board 5 is mounted, the control processor 21 does not initially set the IF board setup storage section 56 of the IF board 5, and sets the IF board 5 to the standby state where the operation of the IF board 5 is disabled (step S63).

The processor 2 employs the IF board ID obtained at step S62 to perform one of the erroneous mounting determination processes for the embodiments shown in FIGS. 5, 6, 12, 15, 18 and 19 (step S64). Whether or not the mounting of the IF board 5 is erroneous is then determined (step S65). When it is ascertained that the IF board 5 is erroneously mounted, the processor 2 does not perform the initial setup process for the IF board setup storage section 56.

When it is ascertained that the IF board 5 is normally mounted, the processor 2 performs the initial setup for the IF board setup storage section 56, and sets the IF board 5 to the operating state (step S66).

Through this process, even when the erroneous mounting of the IF board 5 is detected, a signal is not transmitted from the erroneously mounted IF board 5 to the transmission device 1, and the adverse effect on the correct line due to the erroneous mounting can be avoided.

Figure 22:
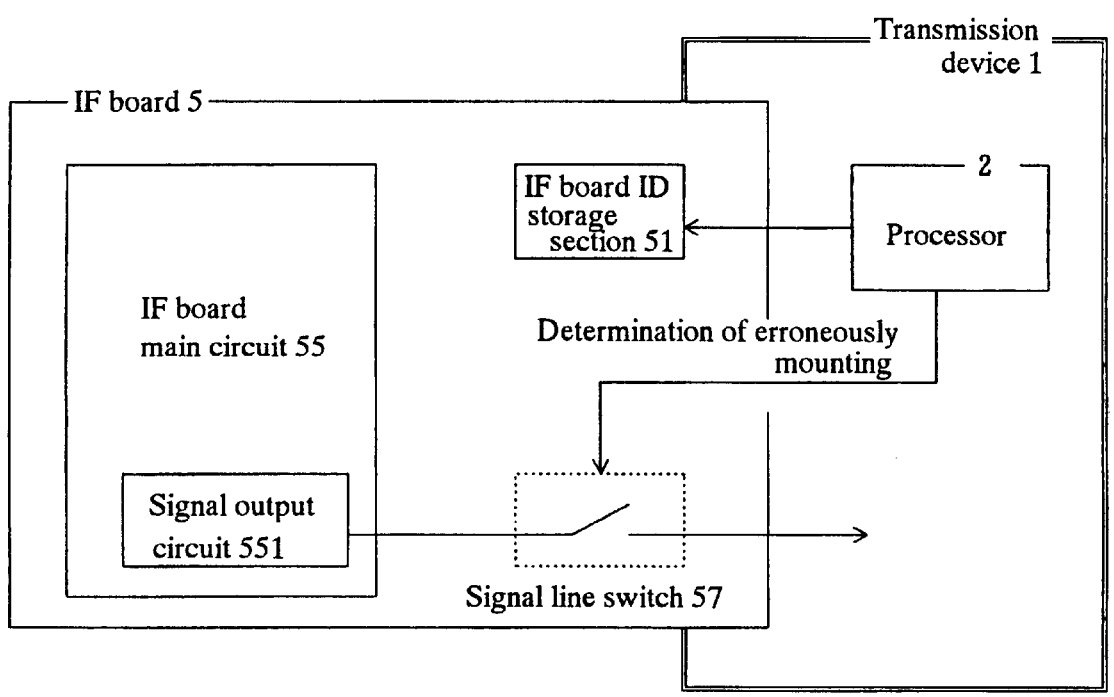
FIG. 22 is a block diagram illustrating another example arrangement of an IF board according to the present invention.

FIG. 22 is a block diagram illustrating another example arrangement of an IF board according to the present invention.

In FIG. 22, a signal line switch 57 (specifically, an electronic switch, such as a transistor or a relay switch) is located between a signal output circuit 551 and a transmission device 1. The signal line switch 57 is switched by employing, as control input, the results obtained by the processor 2 for the determination of the erroneous mounting. The other arrangement is the same as that in FIG. 20.

Figure 23:
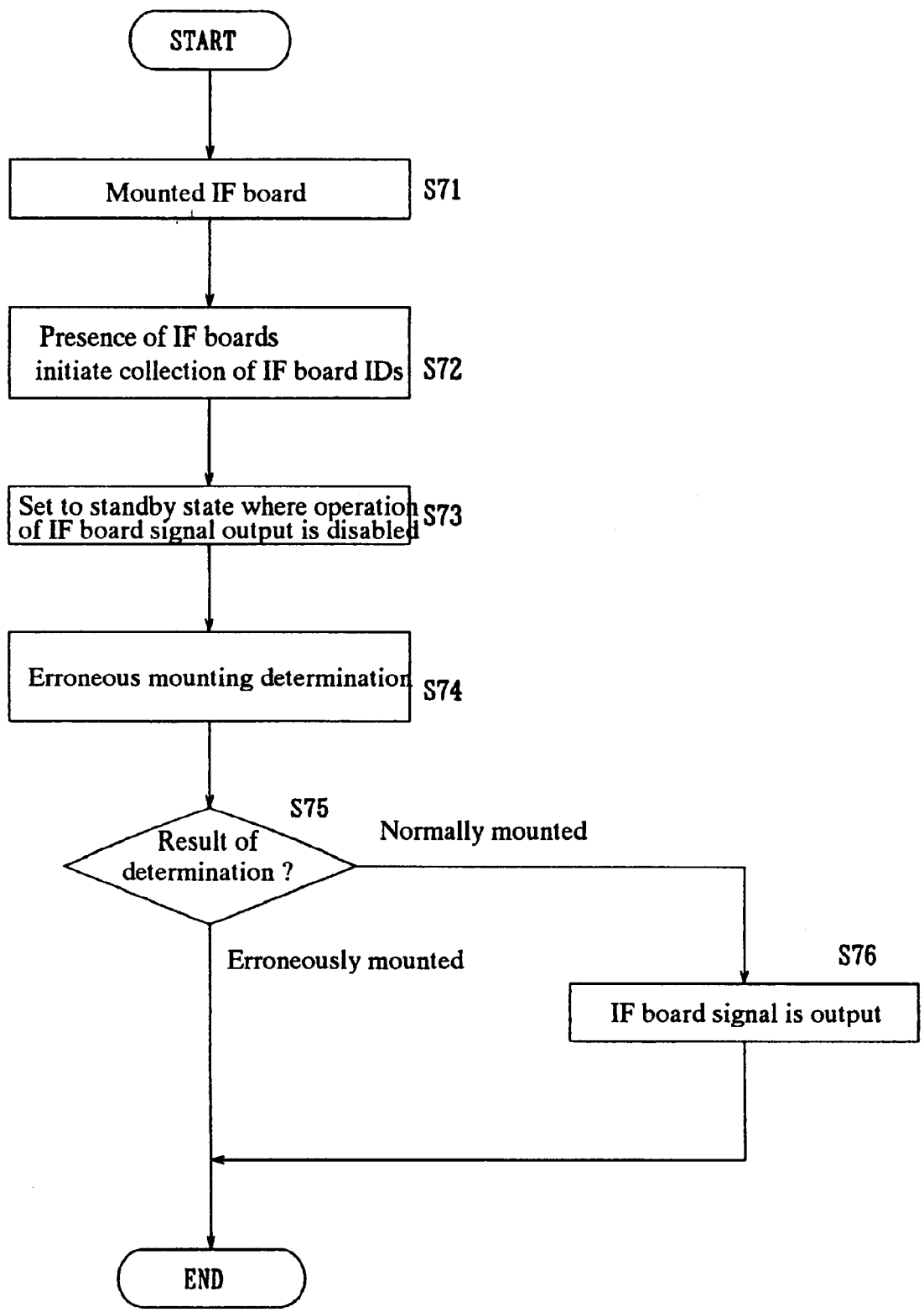
FIG. 23 is a flowchart performed by the arrangement in FIG. 22.

FIG. 23 is a flowchart performed by the arrangement in FIG. 22. When the IF board 5 is mounted in a system 4, or the IF board 5 is already mounted, and the transmission device 1 is activated (step S71), the control processor 21 detects the IF board 5 that is mounted, and acquires the IF board ID of the mounted IF board 5 from the IF board ID storage section 51 of that IF board (step S72).

The processor 2 sets the IF board setup storage section 56 to the standby state where the operation of the IF board 5 is disabled (step S73). Thus, at the time the IF board 5 is mounted, the signal line switch 57 is opened to disconnect the signal output line leading to the device.

The processor 2 employs the IF board ID obtained at step S72 to perform one of the erroneous mounting determination processes for the embodiments shown in FIGS. 5, 6, 12, 15, 18 and 19 (step S74). Whether or not the IF board 5 is mounted erroneously is thereby determined (step S75). When it is ascertained that the IF board 5 is erroneously mounted, the processor 2 keeps the signal line switch 57 of the IF board 5 open.

If it is ascertained that the IF board 5 is normally mounted, the processor 2 sets the IF board to the operating state. That is, the signal output line switch 57 is closed to permit signal output (step S76).

As a result, even when erroneous mounting of the IF board is detected, no signal is transmitted from the erroneously mounted IF board 5 to the transmission device 1, and an adverse effect on the normal line due to the erroneous mounting can be avoided.

Figure 24:
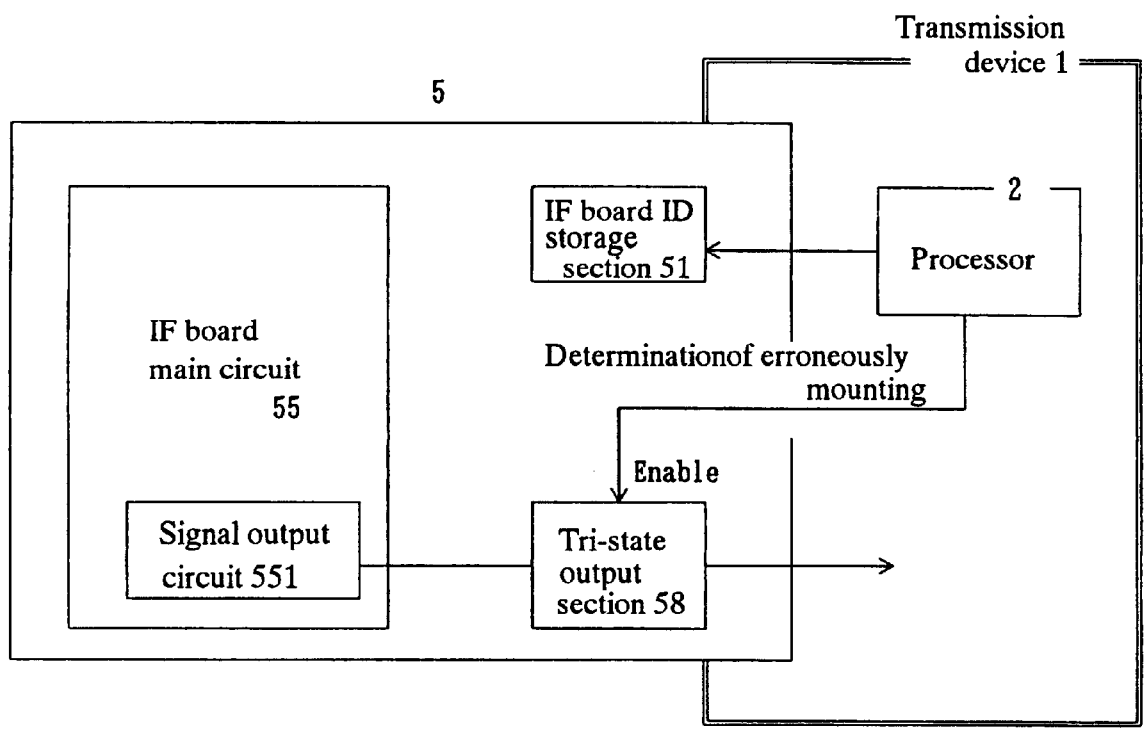
FIG. 24 is a diagram illustrating an additional example arrangement of an IF board according to the present invention.

FIG. 24 is a diagram illustrating an additional example arrangement of an IF board according to the present invention. A tri-state output section 58 is connected to a signal output circuit 551 on an IF board 5, and is operated by employing, as control input, the results of the erroneous mounting determination obtained by the processor 2. The other arrangement is the same as that in FIG. 20.

Figure 25:
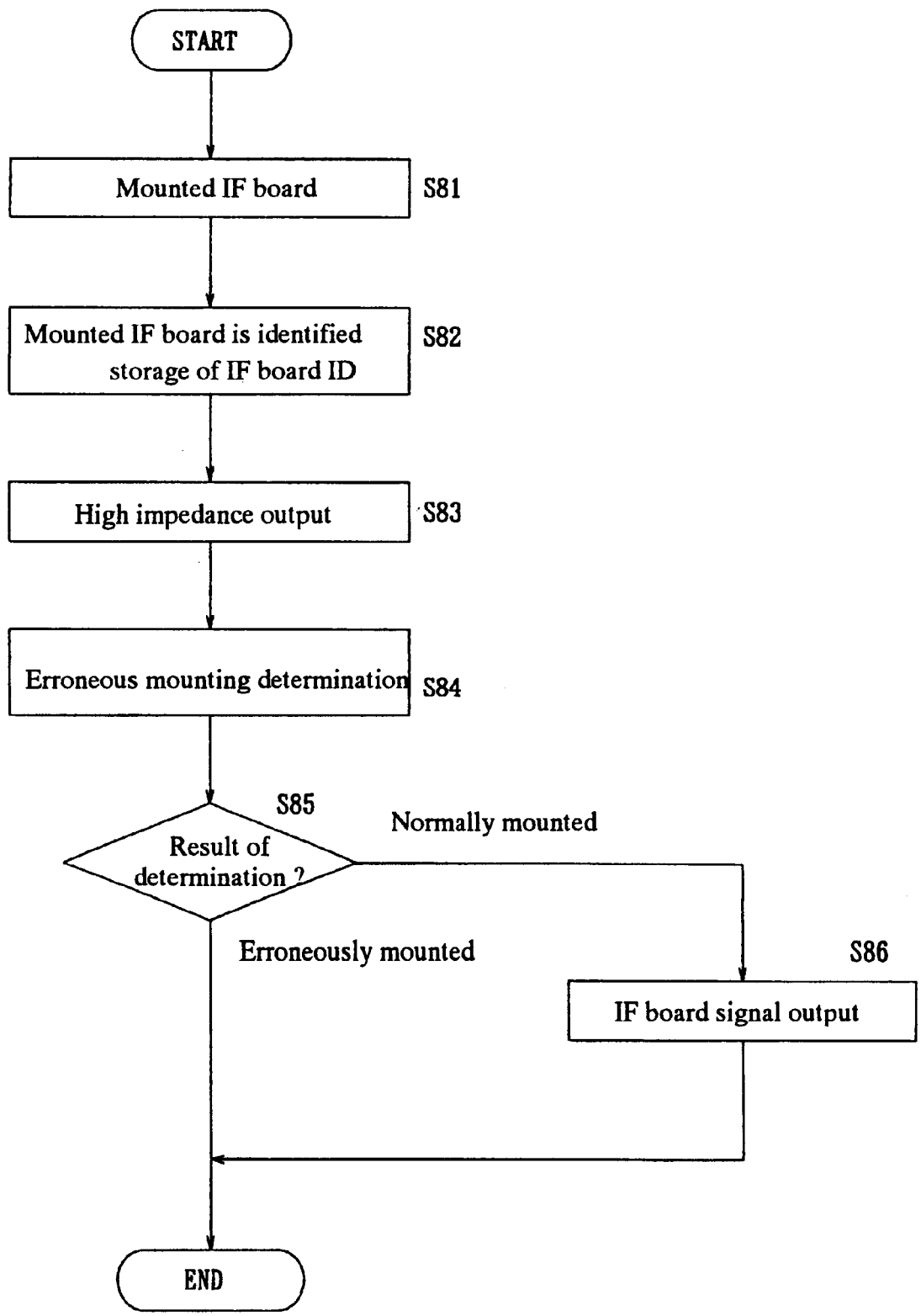
FIG. 25 is a flowchart for the arrangement in FIG. 24.

FIG. 25 is a flowchart for the arrangement in FIG. 24. When the IF board 5 is mounted on a transmission channel interface 4, or when the device is activated (step S81), the processor 2 identifies the IF board 5 that is mounted, and acquires the IF board ID of the mounted IF board 5 from the IF board ID storage section 51 of that IF board (step S82).

At the time the IF board 5 is mounted, high impedance output is set for the tri-state output section 58, and the signal output to the device is disabled (step S83). The processor 2 employs the IF board ID obtained at step S82 to perform an erroneous mounting determination in accordance with one of the processes for the embodiments in FIGS. 5, 6, 12, 15, 18 and 19 (step S84).

Whether or not the IF board 5 is erroneously mounted is determined (step S85). When it is ascertained that the IF board 5 is erroneously mounted, the processor 2 maintains the high impedance output of the tri-state output 58 of the IF board 5. When it is ascertained that the IF board 5 is normally mounted, the processor 2 releases the high impedance state output of the tri-state output section 58 (step S86).

As a result, when the erroneous mounting of the IF board is detected, no signal is transmitted from the erroneously mounted IF board to the device, and an adverse effect on the normal line due to the erroneous mounting can be avoided.

Figure 26:
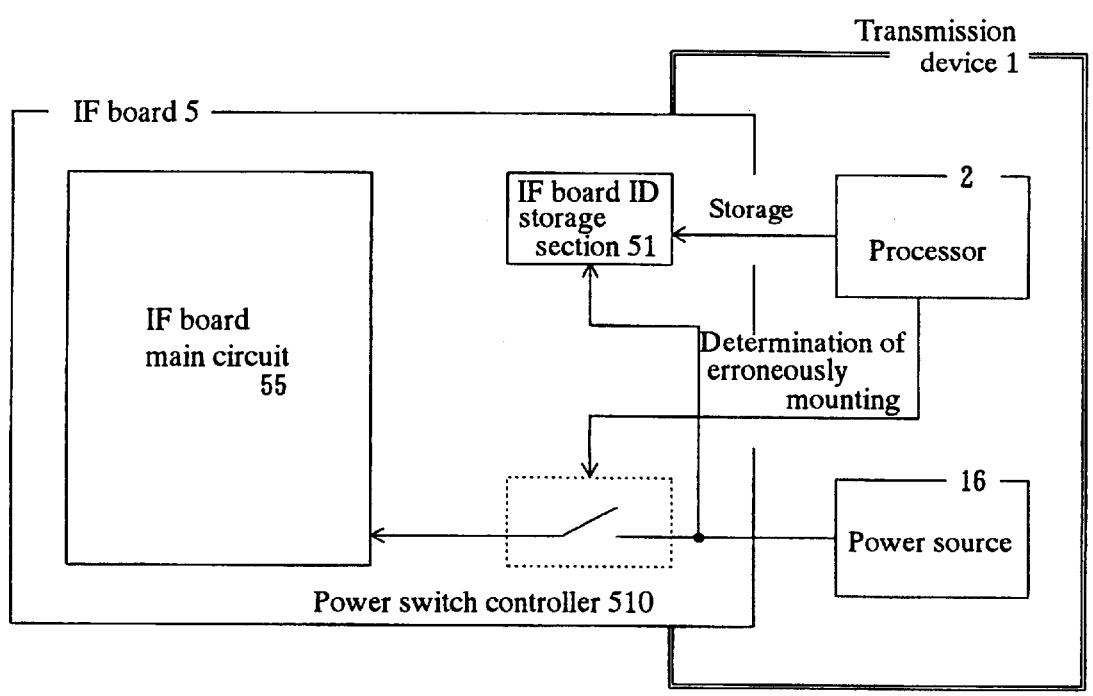
FIG. 26 is a block diagram illustrating a further example arrangement of an IF board.

FIG. 26 is a block diagram illustrating a further example arrangement of an IF board 5. In FIG. 26, a power source 16 in a transmission device 1 supplies power to an IF board main circuit 55 and an IF board ID storage section 51. Therefore, power is supplied via a power switch 510 to the IF board main circuit 55, while power is constantly supplied to the IF board ID storage section 51.

The power switch 510 (specifically, an electronic switch, such as a transistor, or a relay switch) is connected between the IF board main circuit 55 and the power source 16, and performs switching by employing as control input the results of the erroneous mounting determination obtained by the processor 2. The other arrangement is the same as that in FIG. 20.

Figure 27:
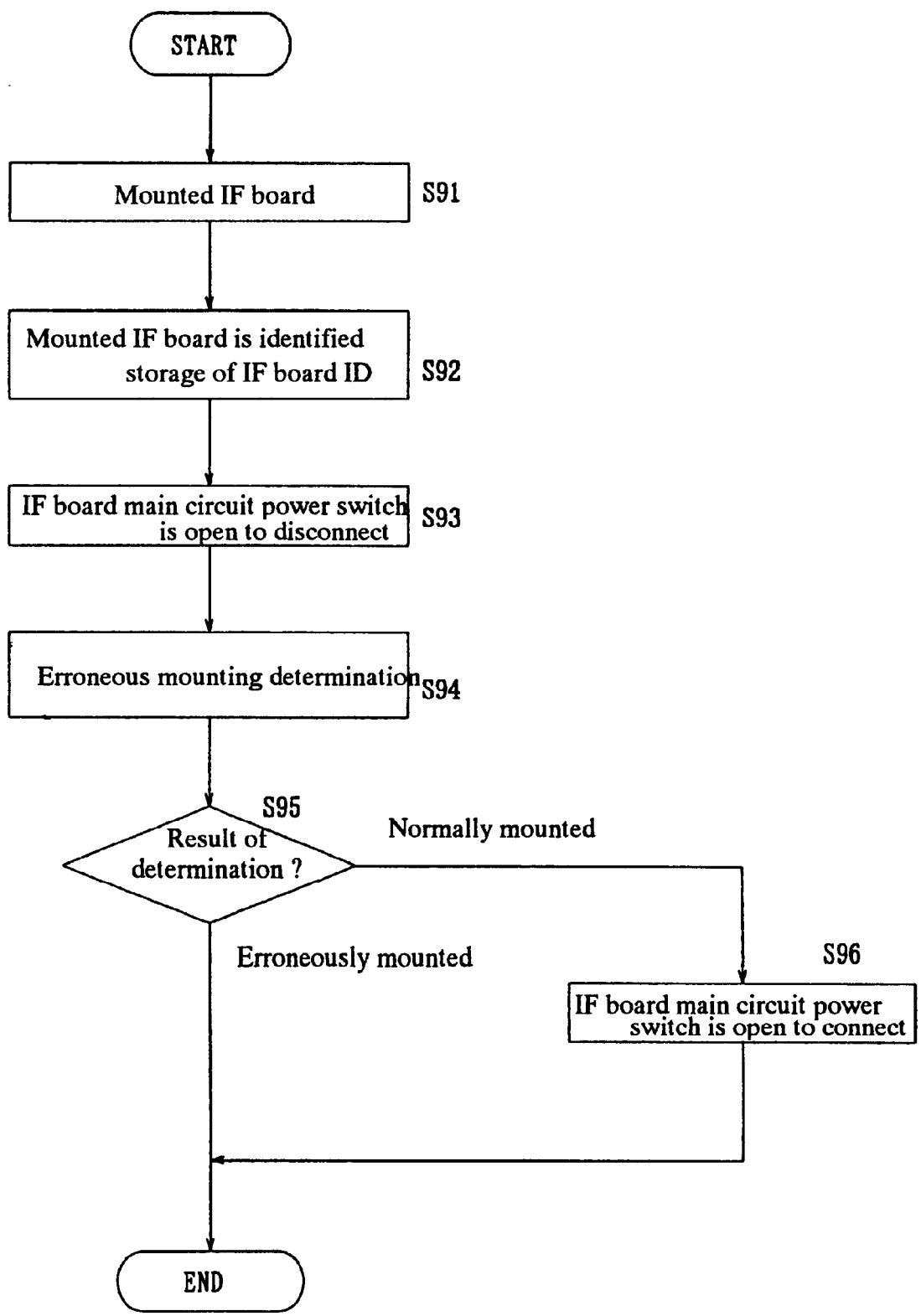
FIG. 27 is a flowchart of the arrangement in FIG. 26.

FIG. 27 is a flowchart for the arrangement in FIG. 26. When the IF board 5 is mounted in a system 4, or when the device 1 is activated (step S91), the processor 2 detects the presence of the mounted IF board 5, and acquires the IF board ID of the mounted IF board from the IF board ID storage section 51 of that IF board 5 (step S92).

At the time the IF board 5 is mounted, the power switch 59 is opened to disconnect the power supply and to set the IF board 5 to the operation disabled state (step S93). The processor 2 employs the IF board ID obtained at step S92 to perform the erroneous mounting determination in accordance with one of the processes for the embodiments in FIGS. 5, 6, 12, 15, 18 and 19 (step S94).

When, as a result (step S95), it is ascertained that the IF board 5 is erroneously mounted, the processor 2 maintains the power switch 59 in the open state. When it is ascertained that the IF board 5 is normally mounted, the processor 2 closes the power switch 59 and sets the IF board 5 to the operating state (step S96).

As a result, when the erroneous mounting of the IF board is detected, no signal is transmitted from the erroneously mounted IF board to the device, and an adverse effect on the normal line due to the erroneous mounting can be avoided.

Figure 28:
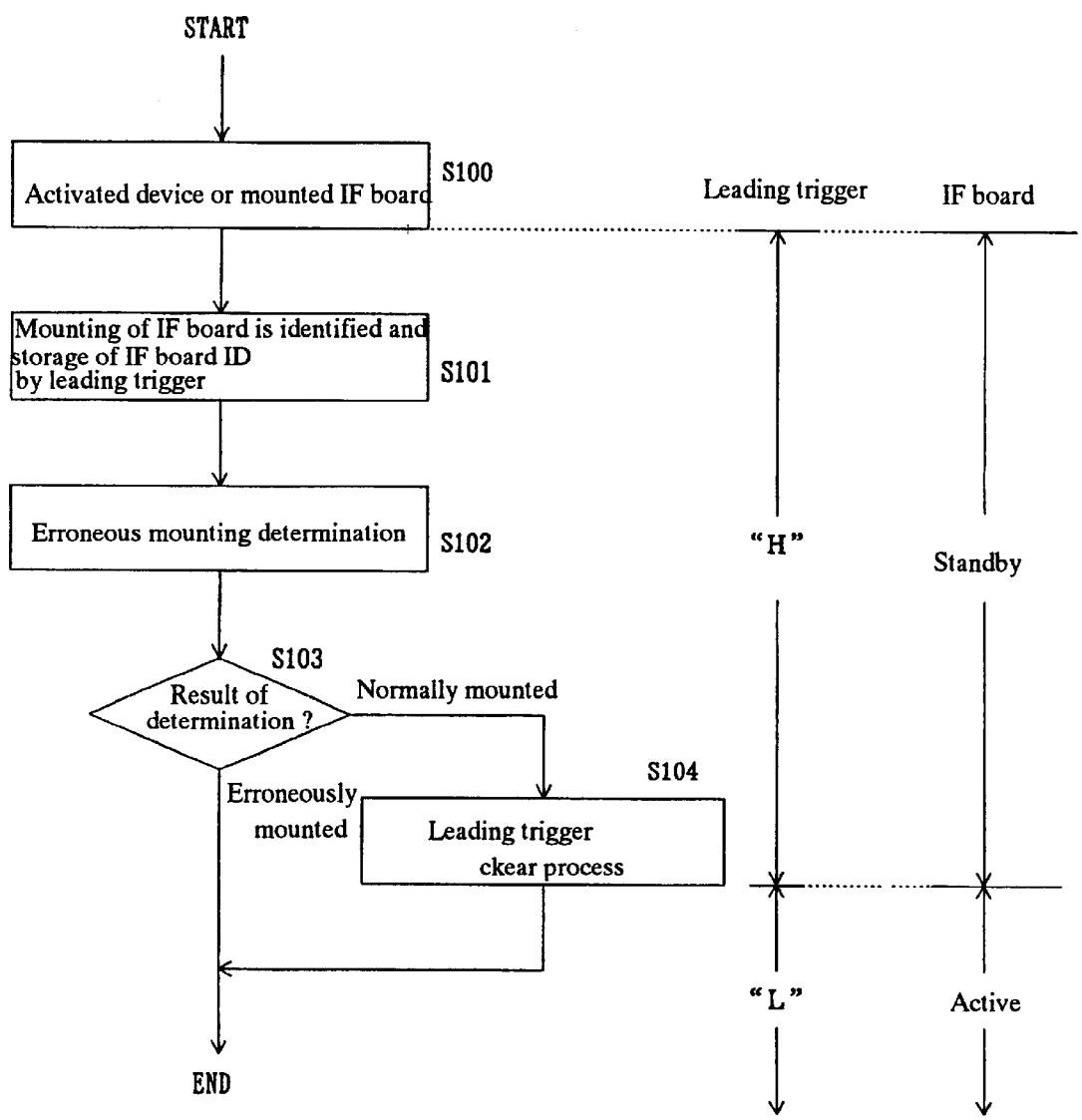
FIG. 28 is a flowchart for a still further embodiment of the present invention.

FIG. 28 is a flowchart for a still further embodiment of the present invention where a leading trigger is employed. When an IF board 5 is already mounted and a transmission device 1 is activated, or when an IF board 5 is mounted during the operation of the transmission device 1, the IF board is set to the standby state, as previously described for the embodiment in FIG. 20 (step S100).

The IF board 5 transmits a leading trigger at level H to a processor 2. A trigger generator will be described later while referring to FIGS. 29 and 30.

A control processor 21 detects the leading trigger and the mounting of the IF board 5, and acquires the IF board ID for the mounted IF board 5 from an IF board ID storage section 51 on the pertinent IF board 5 (step The processor 2 employs the IF board ID obtained at step S101 to perform the erroneous mounting determination in accordance with one of the embodiments in FIGS. 5, 6, 12, 15, 18 and 19 (step S102). The processor determines whether the IF board 5 is erroneously mounted (step S103). When the result indicates an erroneous mounting, a leading trigger clear process is not performed for the mounted IF board 5. If the result indicates a normal mounting, the leading trigger clear process is performed for the mounted IF board 5 (step S104). Then, the leading trigger goes to level "L," and the IF board 5 is shifted to the operating state.

As a result, when the processor employs a leading trigger to determine the erroneous mounting of an IF board 5, the processor can identify the mounting condition of the IF board and can also collect the IF board ID.

Figure 29:
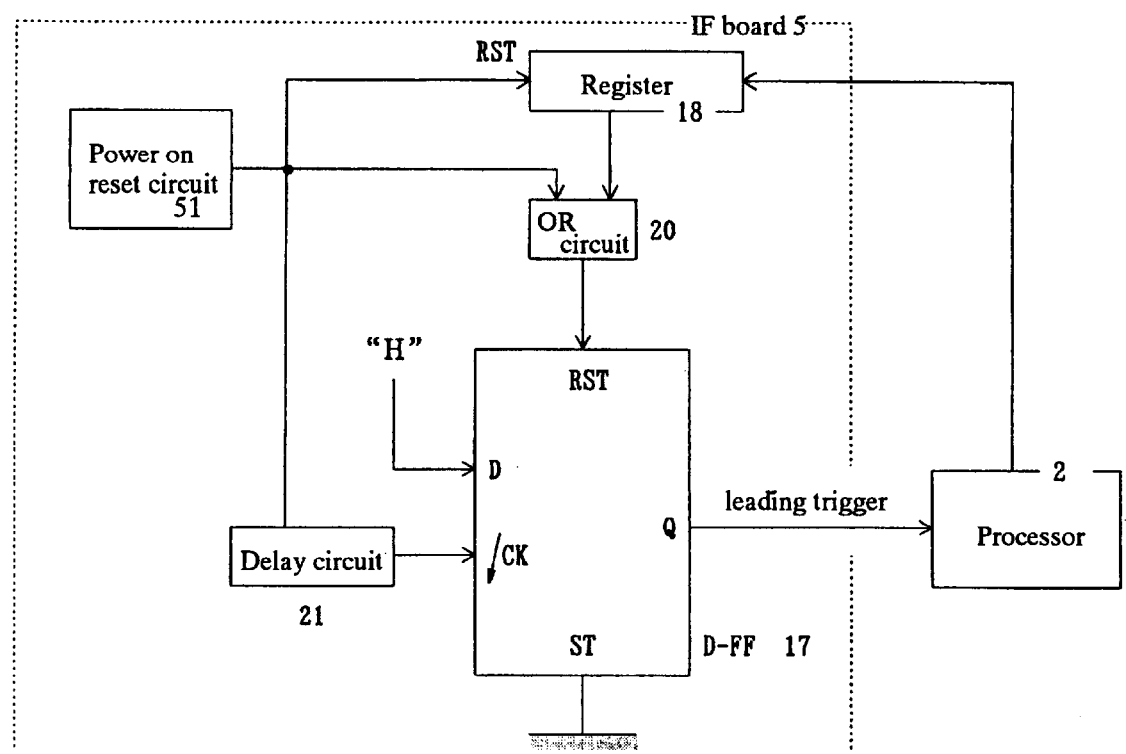
FIG. 29 is a block diagram illustrating an example arrangement of the trigger generator.
Figure 30:
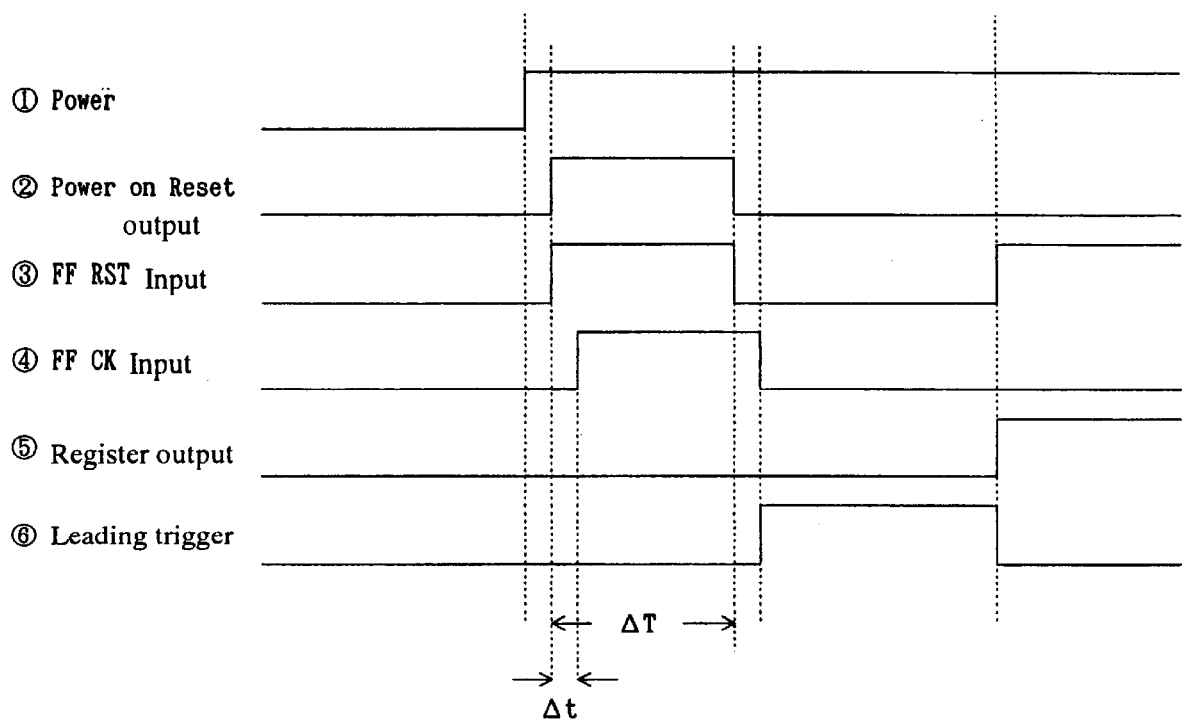
FIG. 30 is a corresponding signal time chart of the trigger generator.

An explanation will now be given for the leading trigger generator that is also used for the embodiments in FIG. 28 and the following diagrams. FIG. 29 is a block diagram illustrating an example arrangement of the trigger generator, and FIG. 30 is a corresponding signal time chart. !First, when the IF board 5 is powered on (①) in FIG. 30), a power-ON reset circuit 19 outputs a pulse having a width of AT ((②) in FIG. 30). As the pulse rises, the output of a D-FF 17 ((⑥) in FIG. 30) goes to "H," and is employed as a leading trigger.

The processor 2 employs the leading trigger to detect the mounting of the IF board 5 ((2) in ④ in FIG. 30). When, as a result of the erroneous mounting determination, the IF board 5 is normally mounted, a command for clearing the leading trigger is written to a register 18.

Then, the output of the register 18 ((⑤) in FIG. 30) goes to level "H," and via an OR circuit 20, the input to the reset terminal (RST) of the D-FF 17 goes to level "H." The output of the D-FF 17 is thus reset, and goes to level "L."

In this manner, a leading trigger (((⑥) in FIG. 30) can be provided which goes to level "H" upon the mounting of the IF board and goes to "L" only when the processor 2 performs the leading trigger clear process.

Figure 31:
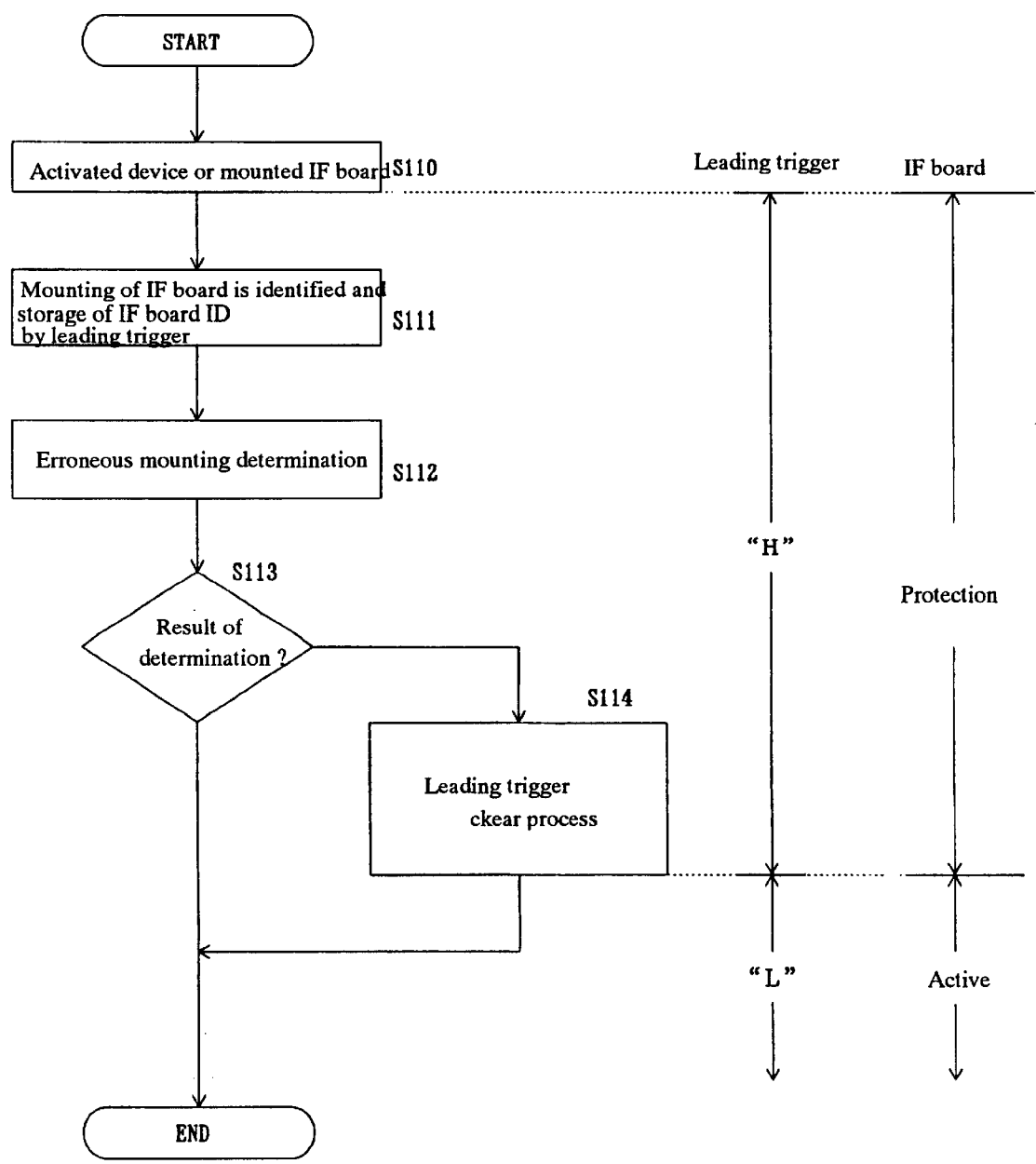
FIG. 31 is a flowchart for yet another embodiment of the present invention.

FIG. 31 is a flowchart for yet another embodiment of the present invention. When a transmission device 1 is activated while an IF board 5 is already mounted, or when an IF board 5 is mounted during the operation of the transmission device 1, the IF board 5 is protected by one of the processes for the embodiments in FIGS. 20, 22, 24 and 26.

The IF board 5 outputs a leading trigger at level "H"0 to a processor 2. The processor 2 detects the leading trigger and the mounting of the IF board 5, and acquires the IF board ID of the mounted IF board from an IF board ID storage section 51 on the pertinent IF board (step S111).

The processor 2 employs the IF board ID obtained at step S111 to perform the erroneous mounting determination according to one of the processes shown in FIGS. 5, 6, 12, 15, 18 or 19 (step S112). A control processor 21 determines whether or not the IF board 5 is erroneously mounted (step S113). When the IF board 5 is erroneously mounted, a leading trigger clear process is not performed for the IF board 5. When the IF board is normally mounted, a leading trigger clear process is performed for the IF board 5 (step S114).

As a result, the leading trigger goes to level "L." The IF board 5 detects the leading of the trigger, and releases the protection of the IF board 5.

Therefore, whether or not the IF board is erroneously mounted can be determined by using a leading trigger, and the protection of the IF board 5 can be released by the clearing of the leading trigger.

The erroneous mounting determination process (step S112) in the flowchart in FIG. 31 can be performed by an erroneous mounting determination method other than the methods employed for the embodiments in FIGS. 5, 6, 12, 18 and 19.

Figure 32:
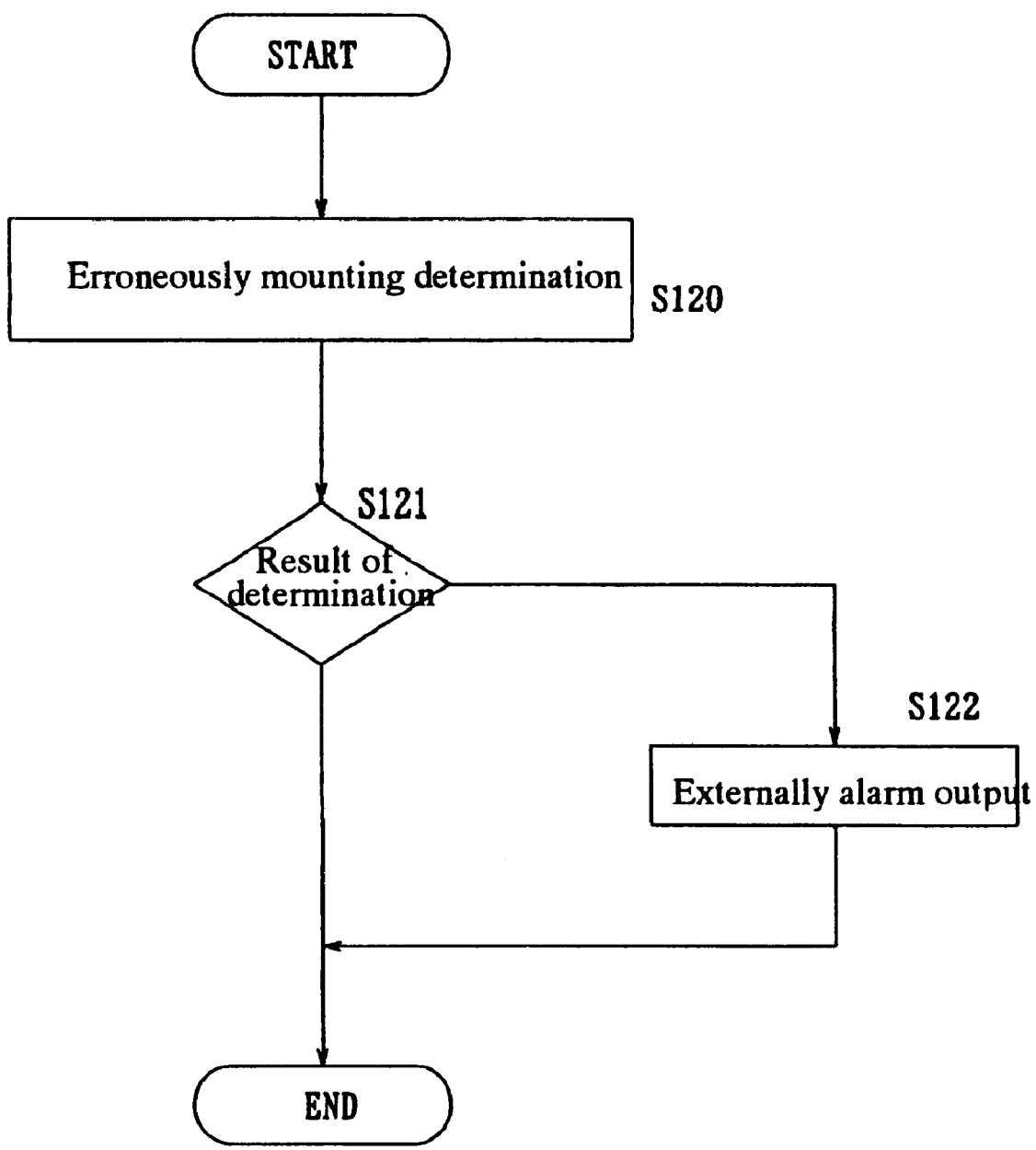
FIG. 32 is a flowchart for processing for yet an additional embodiment of the present invention.

FIG. 32 is a flowchart for the processing for yet an additional embodiment of the present invention. The erroneous mounting determination is performed by one of the methods in the embodiments in FIGS. 5, 6, 12, 15, 18 and 19 (step S120). A check is performed to determine whether or not the IF board 5 is erroneously mounted (step S121). When the IF board 5 is erroneously mounted, a monitor processor 22 outputs a notification to that effect by displaying it on an external monitor 7 (step S122).

According to the method of this embodiment, when an IF board 5 is erroneously mounted, the monitor process 22 can externally output an alarm to inform an operator that the IF board is erroneously mounted, so that the operator can correct the condition at an early time (can exchange the erroneously mounted IF board 5, etc.).

Figure 33:
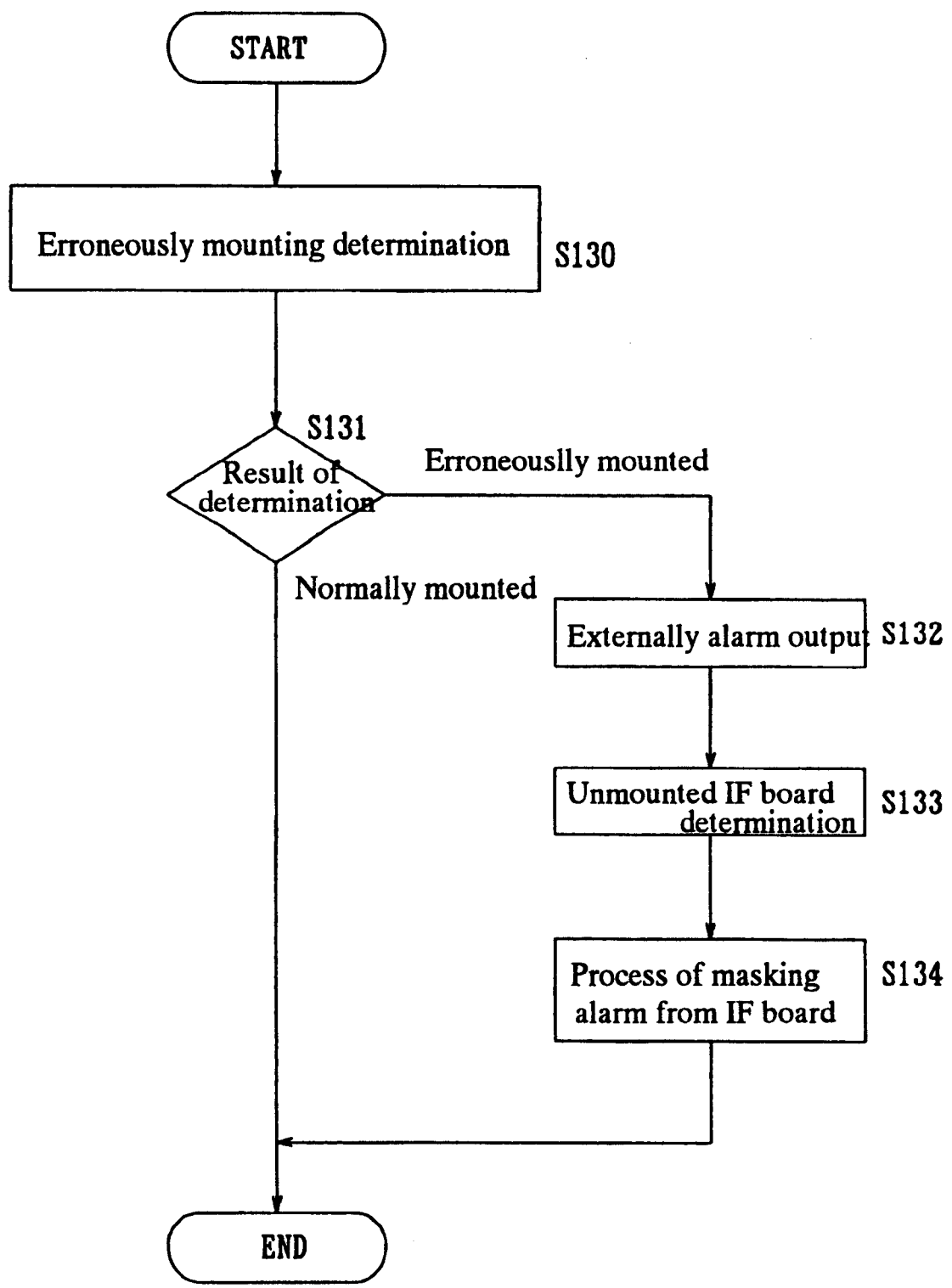
FIG. 33 is a flowchart for one further embodiment of the present invention.
Figure 34:
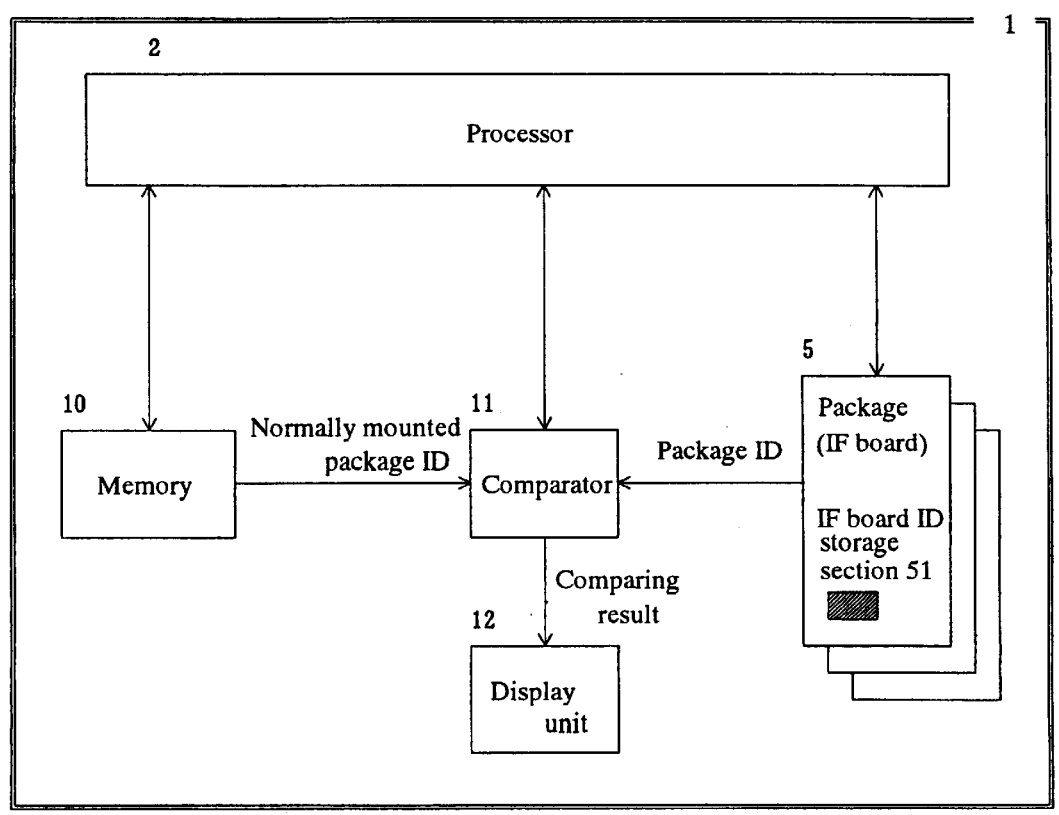
FIG. 34 is a diagram for explaining the arrangement of a transmission device which employs a method by which whether an erroneous mounting has occurred can be determined using an IF board ID.
Figure 35:
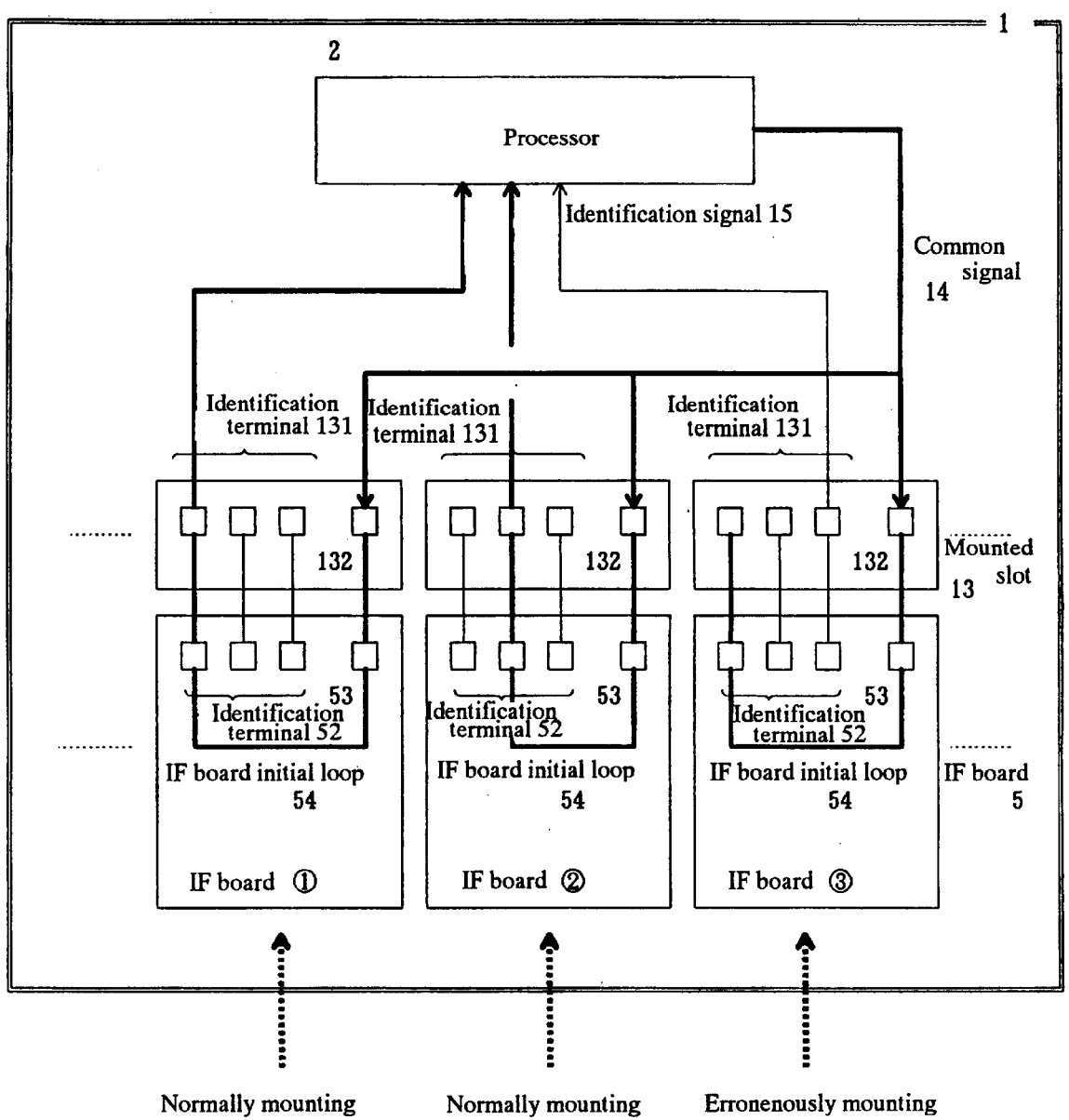
FIG. 35 is a diagram for explaining a method whereby an erroneous mounting is determined by using a difference between the terminal positions of an IF boards.

FIG. 33 is a flowchart for one further embodiment of the present invention. Steps S130 to S132 are the same as steps 120 to S122 in the embodiment in FIG. 32.

At step S133, following step S132, a monitor processor 22 regards, as an "unmounted" IF board, an IF board which is determined to be erroneously mounted. Further, the monitor processor 22 constantly collects the alarm states of the IF boards 5 in the system, and relays the alarm information to an external monitor 7.

Since, at step S133, the erroneously mounted IF board is regarded as "unmounted," the monitor processor 22 does not acquire an alarm generated by the IF board, and masks the alarm. Even when the alarm is generated by the erroneously mounted IF board, a notification for such alarm is not output externally (step S134).

Since the monitor processor 22 regards an erroneously mounted IF board as "unmounted," masks an alarm generated from the IF board, except for an "erroneously mounted" condition, and does not output the alarm externally, an abnormal portion can be easily specified.

As is apparent from the description given for the above embodiments while referring to the drawings, the following effects can be obtained from the present invention.

According to the present invention, backup data, the definition of the priority order for slots, the definition of the priority order for IF boards, and the definition of priorities for already mounted IF boards/newly mounted IF boards during operation are employed to determine whether or not an IF board is erroneously mounted. Thus, whether or not an IF board package is erroneously mounted can be determined in a complicated condition where, for example, one-to-one correspondence is not established for slots and normally mounted IF boards and a determination which depends on the IF package mounted state in a system is required.

Furthermore, protection means when the IF board is erroneously mounted is, for example, means for setting an IF board to a standby state when it is mounted and for setting an IF board to an operating state only when it is normally mounted; means for releasing a signal output line when an IF board is mounted, and for connecting a signal output line only when the IF board is normally mounted; means for setting a signal output line to a high-impedance state when an IF board is mounted and for connecting a signal output line only when the IF board is normally mounted; or means for halting the supply of power to an IF board main circuit when an IF board is mounted and for resuming the supply of power to the main circuit only when the IF board is normally mounted.

As a result, when the erroneous mounting of an IF board is detected, an adverse effect, such as the cutoff of an operation line, affecting IF boards normally mounted in the system can be avoided, and the safety required for operation is ensured.

In addition, the above described IF board package erroneous mounting determination methods of the present invention do not require hardware alterations, and can be implemented merely by changing the software executed by a processor, so that manufacturing costs are low when these methods are used and the methods can be easily applied for a conventional device.

What is claimed is:

1. A method for detecting erroneous package mounting in a transmission device, which includes a plurality of transmission channel interfaces on which a plurality of types of packages having different transmission speeds are to be mounted and on each of which only packages having the same transmission speed are permitted to be mounted, said method comprising the steps of:

determining, when said transmission device is activated, for each of said transmission channel interfaces, whether or not a plurality of types of packages having different transmission speeds are mounted; and when a plurality of types of packages having different transmission speeds coexist at one of said transmission channel interfaces, concluding that all the packages in said transmission channel interface are erroneously mounted.

2. The erroneous package mounting determination method according to claim 1, wherein said packages are set to a standby state upon being mounted, and only when said packages are determined to be normally mounted, said packages are released from said standby state and rendered ready for operation.

3. The erroneous package mounting determination method according to claim 1, wherein signal output is disabled when said packages are mounted, and said signal output is permitted by an initial setup only when said packages are determined to be normally mounted.

4. The erroneous package mounting determination method according to claim 1, wherein signal output is set to a high impedance state when said packages are mounted, and said signal output is permitted by an initial setup only when said packages are determined to be normally mounted.

5. The erroneous package mounting determination method according to claim 1, wherein power is in an off state when said packages are mounted, and power is turned on by an initial setup only when said packages are determined to be normally mounted.

6. The erroneous package mounting determination method according to claim 1, wherein, when it is determined that said packages are erroneously mounted, an alarm is output externally.

7. The erroneous package mounting determination method according to claim 6, wherein a package that is determined to be erroneously mounted is regarded as an unmounted package, and wherein an alarm other than for erroneous package mounting, which is to be output from said package, is masked to externally output an alarm.

8. A method for detecting erroneous package mounting in a transmission device, which includes a plurality of transmission channel interfaces on which a plurality of types of packages having different transmission speeds are to be mounted and on each of which only packages having the same transmission speed are permitted to be mounted, said method comprising the steps of:

storing, as backup data, types of packages mounted for a transmission device in an operating state;

determining, when said transmission device is next activated, for each of a plurality of transmission channel interfaces, whether or not said plurality of types of packages coexist;

comparing said types of packages with backup data when said plurality of types of packages coexist at the same transmission channel interface; and determining that packages whose types are matched are normally mounted packages, and that packages whose types are not matched are erroneously mounted packages.

9. A method for detecting erroneous package mounting in detecting erroneous package mounting in a transmission device, which includes a plurality of transmission channel interfaces on which a plurality of types of packages having different transmission speeds are to be mounted and on each of which only packages having the same transmission speed are permitted to be mounted, said method comprising the steps of:

defining a priority order for each slot in a plurality of transmission channel interfaces; and determining, when a plurality of types of packages coexist at each of said plurality of transmission channel interfaces, that a type of package mounted in a slot having a higher priority order is a normally mounted package, and that a type of package mounted in a slot having a lower priority is an erroneously mounted package.

10. A method for detecting erroneous package mounting in a transmission device, which includes a plurality of transmission channel interfaces on which a plurality of types of packages having different transmission speeds are to be mounted and on each of which only packages having the same transmission speed are permitted to be mounted, said method comprising the steps of:

defining a priority order for a plurality of types of packages having different transmission speeds; and determining, when said plurality of packages coexist at each of a plurality of transmission channel interfaces, whether a package, mounted in a slot, having a higher priority order is a normally mounted package, and whether a package, mounted in a slot, having a lower priority order is an erroneously mounted package.

11. A method for detecting erroneous package mounting in a transmission device, which includes a plurality of transmission channel interfaces on which a plurality of types of packages having different transmission speeds are to be mounted and on each of which only packages having the same transmission speed are permitted to be mounted, said method comprising the steps of:

determining, when new packages are mounted in a plurality of transmission channel interfaces while a transmission device is in operation and when said new package types differ from package types already mounted in the pertinent transmission channel interfaces, that said packages already mounted are normally mounted packages and that new packages are erroneously mounted packages.

12. A method for detecting erroneous package mounting in a transmission device, which includes a plurality of transmission channel interfaces on which a plurality of types of packages having different transmission speeds are to be mounted and on each of which only packages having the same transmission speed are permitted to be mounted, said method comprising the steps of:

determining, when new packages are mounted in a plurality of transmission channel interfaces while a transmission device is in operation and when said new package types differ from package types already mounted in the pertinent transmission channel interfaces, that said new packages are normally mounted packages and that said packages already mounted are erroneously mounted packages.

13. A transmission device comprising:

a plurality of transmission channel interfaces on which a plurality of packages having different transmission speeds are to be mounted; and a processor for examining, when being activated, each of said plurality of transmission channel interfaces to determine whether or not a plurality of types of packages having different transmission speeds coexist thereon, wherein, when said processor ascertains that a plurality of packages having different transmission speeds coexist on one of said transmission channel interfaces, it is assumed that all of said packages in said transmission channel interface are erroneously mounted, and wherein only packages having the same transmission speed are permitted to be mounted on said plurality of transmission channel interfaces.

14. The transmission device according to claim 13, wherein said packages are set to a standby state upon being mounted, and only when said packages are determined to be normally mounted, said packages are released from said standby state and rendered ready for operation.

15. The transmission device according to claim 13, wherein signal output is disabled when said packages are mounted, and said signal output is permitted by an initial setup only when said packages are determined to be normally mounted.

16. The transmission device according to claim 13, wherein signal output is set to a high impedance state when said packages are mounted, and said signal output is permitted by an initial setup only when said packages are determined to be normally mounted.

17. The transmission device according to claim 13, wherein power is in an off state when said packages are mounted, and power is turned on by an initial setup only when said packages are determined to be normally mounted.

18. The transmission device according to claim 13, further comprising a leading trigger oscillator for oscillating a leading trigger to said processor when said packages are mounted, wherein upon detection of said leading trigger, said processor identifies said packages are mounted, collects package type information from said packages, and then clears said leading trigger.

19. The transmission device according to claim 13 wherein, when it is determined that said packages are erroneously mounted, an alarm is output externally.

20. The transmission device according to claim 19, wherein a package that is determined to be erroneously mounted is regarded as an unmounted package, and wherein an alarm other than for erroneous package mounting, which is to be output from said package, is masked to externally output an alarm.

21. A transmission device comprising:

a plurality of transmission channel interfaces on which a plurality of packages having different transmission speeds are to be mounted; and a processor for examining, when being activated, each of said plurality of transmission channel interfaces to determine whether or not a plurality of types of packages having different transmission speeds coexist, said processor having a memory in which to hold, as backup data for each of said plurality of transmission channel interfaces, a type of package which is mounted under an operational condition for said transmission device, wherein, when said transmission device is re-activated, said processor examines each of said plurality of transmission channel interfaces in said transmission device to determine whether or not a plurality of types of packages coexist thereon, and wherein, when said processor ascertains that a plurality of types of packages coexist on one transmission channel interface, said processor compares said packages with said backup data and determines that a package whose type matches said backup data is a normally mounted package, and a package whose type does not match said backup data is an erroneously mounted package.

22. A transmission device according to claim 21, wherein said processor includes a control processor and a monitor processor; said control processor having a memory for storing said types of said packages mounted under an operational condition for said transmission device as backup data for each transmission channel interface in said transmission device, and a table for collecting and storing, where when said transmission device is re-activated, information for said types of said packages mounted, and comparing said backup data with said information in said table and to define an unmatched mounted slot as "unmounted" in said table; and said monitor processor collecting and storing only information concerning a mounted state or an unmounted state of a package, and comparing said information with said table in said control processor to determine whether a mounted slot whose mounted state is matched is a normally mounted slot, and a mounted slot whose mounted state is unmatched is an erroneously mounted slot.

23. A transmission device according to claim 22, wherein functions of said control processor and said monitor processor are achieved by a single CPU.

24. A transmission device according to claim 22, wherein functions of said control processor and said monitor processor are achieved by two independent CPUs.

25. A transmission device comprising:

a plurality of transmission channel interfaces on which a plurality of packages having different transmission speeds are to be mounted; and a processor for examining, when being activated, each of said plurality of transmission channel interfaces to determine whether or not a plurality of types of packages having different transmission speeds coexist, said processor including a slot priority table in which a priority order is defined for each slot in said plurality of transmission channel interfaces, and a table in which, when said transmission device is re-activated, type information concerning said packages which are mounted are collected and stored, wherein said processor refers to said slot priority table and said table, and determines whether a package mounted in a slot having a higher priority is a normally mounted package, and a package mounted in a slot having a lower priority is an erroneously mounted package.

26. A transmission device comprising:

a plurality of transmission channel interfaces on which a plurality of packages having different transmission speeds are to be mounted; and a processor for examining, when being activated, each of said plurality of transmission channel interfaces to determine whether or not a plurality of types of packages having different transmission speeds coexist, said processor including a package priority table in which a priority order is defined for each package in said plurality of transmission channel interfaces, and a table in which, when said transmission device is re-activated, type information concerning said packages which are mounted are collected and stored, wherein said processor refers to said package priority table and said table, and determines whether a package type having a higher priority is a normally mounted package, and a package type having a lower priority is an erroneously mounted package.

* * * * *